US008790218B2

(12) United States Patent
Morimura et al.

(10) Patent No.: US 8,790,218 B2
(45) Date of Patent: Jul. 29, 2014

(54) VEHICLE CONTROL SYSTEM

(75) Inventors: Junichi Morimura, Suntou-gun (JP);
Shinya Kodama, Susono (JP); Satoru Niwa, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 245 days.

(21) Appl. No.: 13/498,489

(22) PCT Filed: Sep. 28, 2009

(86) PCT No.: PCT/JP2009/066809
§ 371 (c)(1),
(2), (4) Date: Mar. 27, 2012

(87) PCT Pub. No.: WO2011/036810
PCT Pub. Date: Mar. 31, 2011

(65) Prior Publication Data
US 2012/0184405 A1  Jul. 19, 2012

(51) Int. Cl.
B60W 10/02  (2006.01)
B60W 10/06  (2006.01)
B60W 10/10  (2012.01)
B60W 10/30  (2006.01)

(52) U.S. Cl.
USPC .................................. 477/54; 477/57; 477/77

(58) Field of Classification Search
USPC ................................................ 477/77, 54, 57
See application file for complete search history.

(56) References Cited

U.S. PATENT DOCUMENTS

| 6,161,427 | A | 12/2000 | Watanabe et al. |
| 7,396,315 | B2 | 7/2008 | Ogawa et al. |
| 2012/0065022 | A1* | 3/2012 | Ohashi et al. ................. 477/77 |
| 2013/0311048 | A1* | 11/2013 | Ahn ............................... 701/48 |

FOREIGN PATENT DOCUMENTS

| JP | 1 303356 | 12/1989 |
| JP | 6 147080 | 5/1994 |
| JP | 11 51969 | 2/1999 |
| JP | 2000 272381 | 10/2000 |
| JP | 2001 56050 | 2/2001 |
| JP | 2001 182584 | 7/2001 |
| JP | 2002 234340 | 8/2002 |
| JP | 2006 15819 | 1/2006 |
| JP | 2006-143000 | 6/2006 |
| JP | 2006 342899 | 12/2006 |

OTHER PUBLICATIONS

International Search Report Issued Nov. 24, 2009 in PCT/JP09/66809 Filed Sep. 28, 2009.

* cited by examiner

Primary Examiner — Sherry Estremsky
(74) Attorney, Agent, or Firm — Oblon, Spivak, McClelland, Maier & Neustadt, L.L.P.

(57) ABSTRACT

Before the termination of the fuel-cut control, the vehicle control system reduces a pumping loss by increasing an air intake and a load torque of an auxiliary device thereby preventing the vehicle to be decelerated excessively, and after the termination of the fuel-cut control, the vehicle control system increases the load torque of the auxiliary device thereby preventing the vehicle to be accelerated abruptly. Therefore, the vehicle speed will not be lowered unnecessarily before the termination of the fuel-cut control so that an execution time of the fuel-cut control can be extended. Moreover, driving comfort can be improved by thus reducing a change in acceleration.

18 Claims, 20 Drawing Sheets

VEHICLE CONTROL SYSTEM

TECHNICAL FIELD

The present invention relates to a control system for controlling a driving force of a vehicle having an internal combustion engine, and especially to a system configured to carry out a fuel-cut control for selectively stopping the delivery of fuel to the internal combustion engine when the vehicle is being decelerated, and to control a driving force or a braking force resulting from carrying out the fuel-cut control.

BACKGROUND ART

An internal combustion engine such as a gasoline engine and a diesel engine are used as a prime mover of a vehicle. The internal combustion engine starts running autonomously when ignited while being rotated at a predetermined speed and delivering the fuel thereto. That is, it is unnecessary to deliver the fuel to the engine in case the engine is being rotated at a speed higher than a reactivatable lower limit speed at which the engine is allowed to rotate autonomously by delivering the fuel thereto, unless driving force is demanded. Therefore, the conventional control systems are configured to carry out the fuel-cut control utilizing the above-explained property for the purpose of improving fuel economy. Specifically, the fuel-cut control is carried out by stopping the delivery of fuel to the engine under the condition in which the vehicle is being decelerated, and the engine is thereby rotated compulsory by an inertia force at the speed higher than the reactivatable lower limit speed.

Thus, the fuel-cut control is carried out under the situation in which the drive force is not demanded, that is, the accelerator is not depressed, and the engine is rotated at the speed higher than the reactivatable lower limit speed. Therefore, in order to improve fuel economy, it is preferable to carry out the fuel-cut control as long as possible by keeping the speed of the engine higher than the reactivatable lower limit speed as long as possible during deceleration of the vehicle. For this purpose, in case the vehicle comprising a torque converter having a lockup clutch, the engine speed is prevented from being lowered during deceleration by keeping the lockup clutch to be engaged within an acceptable range of noises and vibrations. In this situation, since the engine speed is lowered by decelerating the vehicle, a speed change ratio of the vehicle is increased gradually to a low speed side.

An example of the control system for a continuously variable transmission having a lockup clutch, which is configured to carry out the above-explained control during execution of the fuel-cut control is disclosed by Japanese Patent Laid-Open No. 01-303356. Specifically, the controller taught by Japanese Patent Laid-Open No. 01-303356 is applied to a continuously variable transmission comprising a lockup clutch connecting an input side member and an output side member of a fluid coupling. The controller taught by Japanese Patent Laid-Open No. 01-303356 is configured to lower a target torque ratio of the continuously variable transmission in case a slippage of a drive wheel is detected thereby eliminating the slippage, and according to the teachings of Japanese Patent Laid-Open No. 01-303356, the lockup clutch is disengaged when executing the above-explained control. However, if the lockup clutch is disengaged, the torque is transmitted through the fluid coupling. As a result, a transmission capacity of the torque between the input member and the output member is changed, and a driving torque is thereby varied. Therefore, shocks may be caused in the continuously variable transmission.

Meanwhile, a control device for controlling the lockup clutch during deceleration of a vehicle is disclosed by Japanese Patent Laid-Open No. 2002-234340. Specifically, the control device taught by Japanese Patent Laid-Open No. 2002-234340 is configured to extend an execution time of the fuel-cut control by engaging the lockup clutch to keep the engine speed to a relatively high speed during deceleration of the vehicle. That is, the control device taught by Japanese Patent Laid-Open No. 2002-234340 is configured to keep the engine speed higher than the reactivatable lower limit speed. For this purpose, according to the teachings of Japanese Patent Laid-Open No. 2002-234340, a load of an air conditioner is reduced to prevent a drop in the engine speed, during execution of the fuel-cut control while engaging the lockup clutch. In addition, according to the teachings of Japanese Patent Laid-Open No. 2002-234340, a lockup cancellation speed is set to prevent an uncomfortable feeling resulting from deceleration increased by disengaging the lockup clutch.

In addition, another control device for controlling the lockup clutch during deceleration of a vehicle is disclosed by Japanese Patent Laid-Open No. 2006-342899. Specifically, the control device taught by Japanese Patent Laid-Open No. 2006-342899 is configured to prevent an abrupt rise in engine speed when restarting the vehicle, and to prevent an engine stall when braking the vehicle abruptly. For this purpose, according to the teachings of Japanese Patent Laid-Open No. 2006-342899, a lockup pressure for engaging the lockup clutch is raised in case a required time until the vehicle is stopped is long, e.g., in case the vehicle speed is relatively high. To the contrary, the lockup pressure is lowered in case a required time until the vehicle is stopped is short, e.g., in case the vehicle speed is relatively low.

As described, the fuel-cut control is carried out under the situation in which the engine is rotated compulsory by the inertia force of the running vehicle. In this situation, therefore, a friction loss and a pumping loss of the engine act as a braking force. Therefore, a control device disclosed by Japanese Patent Laid-Open No. 2006-143000 is configured to utilize the friction loss and the pumping loss as the braking force under the situation in which the vehicle is coasting. According to the teachings of Japanese Patent Laid-Open No. 2006-143000, the friction loss and the pumping loss used as the braking force are reduced in case a downshifting is carried out under the situation in which the vehicle is coasting.

In addition, Japanese Patent Laid-Open No. 2000-272381 discloses a control system, which is configured to cooperatively carry out a control of a speed change ratio to keep the engine speed to a relatively high speed, and a control of the pumping loss of the engine. According to the teachings of Japanese Patent Laid-Open No. 2000-272381, in case the fuel-cut control is carried out during deceleration of the vehicle, the speed change ratio is increased gradually to keep the engine speed higher than the reactivatable lower limit speed. In this situation, the pumping loss of the engine is reduced to prevent an increase in deceleration resulting from thus increasing the speed change ratio, by increasing an opening degree of an accelerator gradually, while reducing a load resulting from operating an air conditioner.

In case of carrying out the fuel-cut control, an output torque of the engine is lowered. To the contrary, in case of restarting the delivery of fuel to the engine, the output torque of the engine is increased. Therefore, Japanese Patent Laid-Open No. 2001-182584 discloses a control device for preventing an occurrence of shocks resulting from such fluctuation of the engine torque. Specifically, the control device taught by Japanese Patent Laid-Open No. 2001-182584 is configured to reduce torque down shock resulting from execution of the fuel-cut by reducing an amount of torque reduction resulting from execution of the fuel-cut. For this purpose, according to the teachings of Japanese Patent Laid-Open No. 2001-182584, a generating amount of an alternator is reduced and an opening degree of an accelerator is increased before starting the fuel-cut control. The control device taught by Japanese Patent Laid-Open No. 2001-182584 is also configured to reduce torque up shock resulting from terminating the fuel-cut by increasing generating amount of the alternator while reducing an opening degree of the throttle valve.

As described, in order to prevent an uncomfortable feeling resulting from the deceleration, the control device taught by Japanese Patent Laid-Open No. 2002-234340 is configured to set the lockup cancellation speed. Therefore, according to the teachings of Japanese Patent Laid-Open No. 2002-234340, the lockup clutch has to be disengaged at a relatively high speed. For this reason, the execution time of the fuel-cut control may be shortened and a fuel saving effect may be degraded. In addition, when the lockup clutch is disengaged, negative torque acting on the drive wheel is reduced thereby causing shocks. Further, the delivery of fuel to the engine is restarted and the engine is thereby driven to output the torque when the lockup clutch is disengaged. In this situation, therefore, the shocks may be amplified by such activation of the engine and the disengagement of the lockup clutch.

As also described, the control device taught by Japanese Patent Laid-Open No. 2006-342899 is capable of preventing an abrupt rise in engine speed and an engine stall resulting from a delay of disengagement of the lockup clutch. However, although the lockup clutch is disengaged when the vehicle is decelerated, the driving torque is fluctuated before and after the disengagement of the lockup clutch. Therefore, the shocks may be amplified by such disengagement of the lockup clutch.

In addition, the control devices taught by Japanese Patent Laid-Opens No. 2006-143000, No. 2000-272381, and No. 2001-182584 are also capable of reducing a torque fluctuation resulting from execution of the fuel-cut and the downshifting for keeping the engine speed. As described, according to the teachings of those prior art documents, the engine speed is kept to a relatively high speed by engaging the lockup clutch while the vehicle is coasting, that is, during deceleration of the vehicle. However, if the lockup clutch is disengaged when the vehicle is further decelerated in this situation, a transmission torque capacity of the torque converter is varied. As a result, shocks may be amplified by such variation in the transmission torque capacity of the torque converter.

DISCLOSURE OF THE INVENTION

The present invention has been conceived noting the technical problems thus far described, and its object is to reduce shocks resulting from disengaging a lockup clutch during deceleration of a vehicle.

According to the present invention, there is provided a vehicle control system. The vehicle control system is applied to a vehicle comprising: a fluid transmission mechanism, which is provided with a lockup clutch configured to directly connect an input member and an output member transmitting torque therebetween through a fluid, and which is connected with an output side of an internal combustion engine; and an auxiliary device, which is connected with the internal combustion engine to be driven by a torque of the internal combustion engine. The vehicle control system is configured to stop a delivery of fuel to the internal combustion engine while increasing a speed change ratio of a transmission thereby increasing a speed of the internal combustion engine in case the vehicle is decelerated while engaging the lockup clutch, and to disengage the lockup clutch prior to restarting the delivery of fuel to the internal combustion engine. According to the present invention, a load of the auxiliary device applied to the internal combustion engine is lightened to suppress an increase in the deceleration of the vehicle resulting from increasing the speed change ratio while engaging the lockup clutch, and the load of the auxiliary device applied to the internal combustion engine is increased to suppress an increase in the torque increased by restarting the delivery of fuel to the internal combustion engine.

In other words, the vehicle control system according to the present invention comprises: a load lightening means, which lightens a load of the auxiliary device applied to the internal combustion engine thereby suppressing an increase in the deceleration of the vehicle resulting from increasing the speed change ratio while engaging the lockup clutch; and a load increasing means, which increases the load of the auxiliary device applied to the internal combustion engine thereby suppressing an increase in the torque increased by restarting the delivery of fuel to the internal combustion engine.

Specifically, the internal combustion engine comprises a throttle valve configured to control air intake of the internal combustion engine, and an opening degree of the throttle valve is increased in case the delivery of fuel to the internal combustion engine is stopped while increasing the speed change ratio.

As described, the internal combustion engine comprises a throttle valve configured to control air intake of the internal combustion engine, and the vehicle control system according to the present invention further comprises a throttle opening increasing means, which increases an opening degree of the throttle valve in case the delivery of fuel to the internal combustion engine is stopped while increasing the speed change ratio.

Specifically, the opening degree of the throttle valve is increased to the maximum possible degree in case the load of the auxiliary device applied to the internal combustion engine is large. That is, the aforementioned throttle opening increasing means is configured to increase the opening degree of the throttle valve to the maximum possible degree in case the load of the auxiliary device applied to the internal combustion engine is large.

In addition, according to the present invention, a torque command to drive the auxiliary device is added to an output torque command of the internal combustion engine just after a disengagement of the lockup clutch. In case the speed of the internal combustion engine is not reduced even if the load torque of the auxiliary device is applied to the internal combustion engine just after the disengagement of the lockup clutch, the output torque command and the torque command to drive the auxiliary device is reduced to be smaller than the current output torque command. To the contrary, in case the speed of the internal combustion engine is reduced by the load torque of the auxiliary device applied to the internal combustion engine just after the disengagement of the lockup clutch, the output torque command is set to a value which can prevent the engine speed from being lowered.

In other words, the vehicle control system according to the present invention further comprises: a torque command means, which is adapted to add a torque command to drive the auxiliary device to an output torque command of the internal combustion engine just after a disengagement of the lockup clutch; and a means adapted to reduce the output torque command and the torque command to drive the auxiliary device is reduced to be smaller than the current output torque command in case the speed of the internal combustion engine is not reduced even if the load torque of the auxiliary device is applied to the internal combustion engine just after the disengagement of the lockup clutch, and to set the output torque command to a value which can prevent the engine speed from being lowered, in case the speed of the internal combustion engine is reduced by the load torque of the auxiliary device applied to the internal combustion engine just after the disengagement of the lockup clutch.

According to another aspect of the present invention, the vehicle control system is also applied to a vehicle comprising: a fluid transmission mechanism, which is provided with a lockup clutch configured to directly connect an input member and an output member transmitting torque therebetween through a fluid, and which is connected with an output side of an internal combustion engine; and an auxiliary device, which is connected with the internal combustion engine to be driven by a torque of the internal combustion engine. The vehicle control system of another aspect of the present invention is also configured to stop a delivery of fuel to the internal combustion engine while increasing a speed change ratio of a transmission thereby increasing a speed of the internal combustion engine in case the vehicle is decelerated while engaging the lockup clutch, and to disengage the lockup clutch prior to restarting the delivery of fuel to the internal combustion engine. According to another aspect of the present invention, the speed change ratio at a moment when the lockup clutch is to be disengaged is estimated, and the load of the auxiliary device to reduce deceleration of the vehicle resulting from increasing the speed change ratio is adjusted based on the speed change ratio at a moment when started to be increased, the estimated speed change ratio, and a current speed change ratio.

In other words, the vehicle control system of another aspect of the present invention comprises: a speed change ratio estimating means, which estimates a speed change ratio at a moment when the lockup clutch is to be disengaged is estimated; and a load adjusting means, which adjusts the load of the auxiliary device to reduce deceleration of the vehicle resulting from increasing the speed change ratio, based on the speed change ratio at a moment when started to be increased, the estimated speed change ratio, and a current speed change ratio.

According to still another aspect of the present invention, the vehicle control system is also applied to a vehicle comprising: a fluid transmission mechanism, which is provided with a lockup clutch configured to directly connect an input member and an output member transmitting torque therebetween through a fluid, and which is connected with an output side of an internal combustion engine; and an auxiliary device, which is connected with the internal combustion engine to be driven by a torque of the internal combustion engine. The vehicle control system of still another aspect of the present invention is also configured to stop a delivery of fuel to the internal combustion engine while increasing a speed change ratio of a transmission thereby increasing a speed of the internal combustion engine in case the vehicle is decelerated while engaging the lockup clutch, and to disengage the lockup clutch prior to restarting the delivery of fuel to the internal combustion engine. According to still another aspect of the present invention, a load torque of the auxiliary device applied to the internal combustion engine is calculated using an equation of motion, wherein acceleration of a case in which the load of the auxiliary device is applied to the internal combustion engine, a speed change ratio, and a vehicle weight are used as parameters. In addition, the load torque of the auxiliary device is adjusted to a value possible to keep the acceleration of the vehicle within a predetermined range.

In other words, the vehicle control system of still another aspect of the present invention comprises: a load torque calculating means, which calculates a load of the auxiliary device applied to the internal combustion engine using an equation of motion, wherein acceleration of a case in which the load of the auxiliary device is applied to the internal combustion engine, a speed change ratio, and a vehicle weight are used as parameters; and a load torque control means, which adjust the load torque of the auxiliary device to a value possible to keep the acceleration of the vehicle within a predetermined range.

According to the vehicle control system of another aspect of the present invention, a time point to disengage the lockup clutch is estimated based on the acceleration of the vehicle.

In other words, the vehicle control system of another aspect of the present invention comprises a disengagement estimating means, which estimates a time point to disengage the lockup clutch based on the acceleration of the vehicle.

According to the present invention, the auxiliary device includes an alternator, which is connected with the internal combustion engine to be driven to generate an electric power.

Thus, according to the present invention, the load of the auxiliary device applied to the internal combustion engine is lightened in accordance with an increase in the speed change ratio, in case the vehicle is decelerated while carrying out the fuel-cut control and engaging the lockup clutch. Therefore, the vehicle can be prevented from being decelerated excessively before a termination of the fuel-cut control. Meanwhile, after the termination of the fuel-cut control, the load torque applied to the internal combustion engine is increased to prevent the vehicle to be accelerated abruptly. Therefore, a fluctuation of the driving torque of the vehicle can be reduced before and after the disengagement of the lockup clutch.

According to the present invention, an opening degree of the throttle valve is increased to reduce a pumping loss of the internal combustion engine in case the vehicle is decelerated while increasing the speed change ratio. Therefore, in addition to above-explained advantages, the vehicle can be prevented from being decelerated excessively before the termination of the fuel-cut control.

Specifically, the opening degree of the throttle valve is increased to the maximum possible degree in case the load of the auxiliary device applied to the internal combustion engine is large. Therefore, in addition to above-explained advantages, the pumping loss can be reduced significantly. Moreover, an increase in the acceleration is suppressed after the restarting of the delivery of fuel to the internal combustion engine by increasing the load torque of the auxiliary device applied thereto. Therefore, the vehicle can be prevented from being accelerated abruptly after the restart of the delivery of the fuel thereto.

Before the fuel-cut control is terminated, the lockup clutch is engaged and the opening degree of the throttle valve is increased to reduce the pumping loss. Therefore, the output torque of the internal combustion engine has to be increased after the lockup clutch is disengaged and the delivery of fuel is restarted. In this situation, in case the speed of the internal combustion engine will not be lowered after the termination of the fuel-cut control even if the increased load torque of the auxiliary device is applied to the internal combustion engine, the torque command for driving the auxiliary device is subtracted from the torque command applied to the internal combustion engine. Therefore, the torque command for driving the internal combustion engine is reduced in the amount of the torque command for driving the auxiliary device so that the output torque of the internal combustion engine will not be increased excessively after the termination of the fuel-cut control. To the contrary, in case the speed of the internal combustion engine can be lowered by the load of the auxiliary device applied thereto after the termination of the fuel-cut control, the torque command for driving the internal combustion engine is increased in order not to drop the speed of the engine unnecessarily.

According to another aspect of the present invention, the speed change ratio at a moment of disengaging the lockup clutch is estimated, and the load torque of the auxiliary device for suppressing the deceleration of the vehicle is adjusted based on the speed change ratio at a moment when started to be increased and the speed change ratio thus estimated. Therefore, deceleration of the vehicle can be adjusted properly before the termination of the fuel-cut control so that the vehicle can be prevented from being decelerated excessively before the termination of the fuel-cut control.

According to still another aspect of the present invention, a value of the load torque of the auxiliary device applied to the internal combustion engine, which is appropriate to adjust the deceleration of the vehicle within a predetermined range before the termination of the fuel-cut control, is calculated using an equation of motion wherein acceleration, a speed change ratio, and a vehicle weight are used as parameters. Therefore, deceleration of the vehicle can be adjusted properly before the termination of the fuel-cut control so that the vehicle can be prevented from being decelerated excessively before the termination of the fuel-cut control.

In addition, according to the present invention, the lockup clutch is disengaged prior to restarting the delivery of fuel to the internal combustion engine, and the vehicle speed is lowered by increasing the speed change ratio. Therefore, a point of disengaging the lockup clutch, and a vehicle speed at a moment when the lockup clutch is disengaged can be estimated based on the deceleration during an execution of the fuel-cut control.

As described, according to the present invention, the auxiliary device includes an alternator, and the alternator can be controlled by controlling a current and a voltage applied thereto.

BEST MODE FOR CARRYING OUT THE INVENTION

Figure 18:
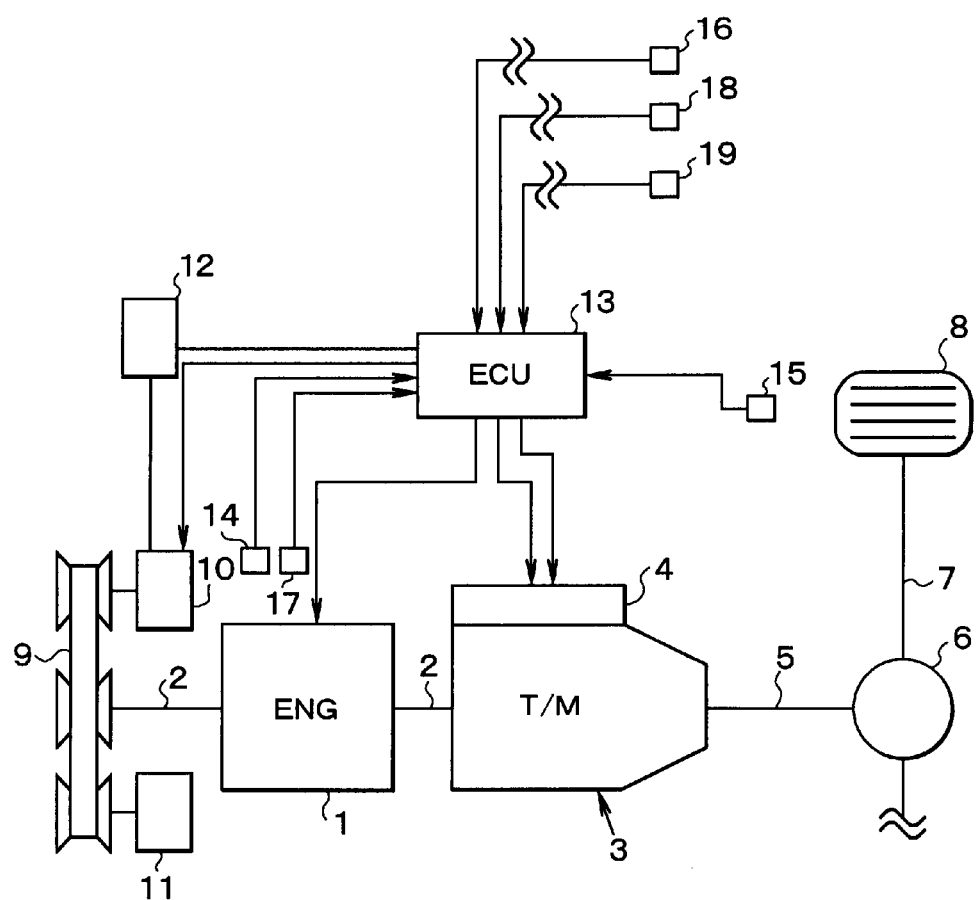
FIG. 18 is a view showing an example of a structure of the vehicle to which the present invention is applied.

Next, the present invention will be explained in more detail. First of all, a vehicle to which the present invention is applied will be explained with reference to FIG. 18 schematically showing a structure of the vehicle. As shown in FIG. 18, the vehicle is provided with an internal combustion engine (as will be called a vehicle hereinafter) 1. Specifically, an engine possible to carry out a fuel-cut control by stopping a delivery of fuel thereto during inspiring air is used as the engine 1. A transmission 3 for changing a speed change ratio is connected with an output shaft (i.e., a crank shaft) 2 of the engine 1. Therefore, a torque of the engine 1 is outputted from the transmission 3 while being changed according to the speed change ratio. Specifically, the transmission 3 is provided integrally with a hydraulic control unit 4, and configured to change a speed change ratio thereof or to shift a gear stage thereof by controlling the hydraulic control unit 4 electrically. The torque increased or decreased by the transmission 3 is transmitted to a drive wheel 8 through a propeller shaft 5, a differential 6 and a drive shaft 7. In addition, auxiliary devices, specifically, an alternator 10 and a compressor 11 for an air conditioner are connected with the output shaft 2 of the engine 1 through a driving belt. That is, those auxiliary devices are driven by the torque of the engine 1. In addition, an electric storage device (i.e., a battery) 12 is connected with the alternator 11 so that an electric power generated by the alternator 10 is stored in the electric storage device 12.

Specifically, the hydraulic control unit 4 is configured to engage and disengage engagement devices of the transmission 3. For this purpose, an electronic control unit (abbreviated as ECU) 13 transmits a control signal to the hydraulic control unit 4 thereby actuating a linear solenoid valve or a primary regulator valve of the hydraulic control unit 4 so as to control a hydraulic pressure established by an oil pump (not shown). The oil discharged from the oil pump is also supplied to a lubricating circuit. For this purpose, a flow rate of the oil is regulated by the linear solenoid flow rate controlling valve and an orifice, and the oil thus regulated is supplied to the engagement devices of the transmission 3.

The ECU 13 is composed mainly of a microcomputer having a processing unit (i.e., CPU), memory units (e.g., RAM and ROM) and an input/output interface. In order to control the engine 1, the hydraulic control unit 4, the alternator 10 and so on, the ECU 13 is configured to carry out a calculation based on signals (i.e., data) inputted thereto, and to output a calculation result to those devices in the form of a control signal. For example, signals from an engine speed sensor 14 for detecting a rotational speed of the engine 1, a wheel speed sensor 15 for detecting a vehicle speed V, an acceleration sensor 16 for estimating a driving condition of the vehicle by detecting acceleration of the vehicle, a throttle sensor 17 for detecting an opening degree of the throttle valve controlling air intake of the engine 1, an accelerator opening sensor 18 for detecting a depression of an accelerator pedal (not shown), a brake stroke sensor 19 for detecting a depression of a (not shown) brake pedal (i.e., a brake stroke), and a pressure sensor for detecting a pressure of a master cylinder converting a depressing force of the brake pedal into hydraulic pressure and so on are inputted to the ECU 13. Meanwhile, the ECU 10 is configured to output a signal for controlling a throttle actuator adapted to control an opening degree of a throttle valve electrically, a fuel-cut signal for stopping the delivery of the fuel temporary, a signal for controlling an exciting current value or a voltage command value to control generating amount of the alternator 10, a signal for controlling a speed change ratio of the transmission 3, a signal for controlling an amount of the lubricating oil supplied to the engagement devices of the transmission 3 and so on.

Here will be explained the aforementioned fuel-cut control. Specifically, the fuel-cut control is a control to stop the delivery of fuel to the engine 1 upon the satisfaction of a predetermined condition, and to drive the engine 1 autonomously by restarting the delivery of fuel. The control signal for stopping the delivery of fuel may be outputted from the aforementioned EUC 13. Alternatively, it is also possible to arrange a (not shown) separate computer adapted to output a signal for carrying out the fuel-cut control. The condition to execute the fuel-cut control is categorized into a precondition and an execution condition. The precondition includes: a fact in that a warm-up of the engine 1 has been completed; a temperature of a (not shown) three-way purifying catalyst is raised to a predetermined activating temperature; a fact in that there is no failure on the sensors, and so on. Meanwhile, the execution condition includes: a fact in that an opening degree of the accelerator is substantially zero, or smaller than a predetermined criterion value; a fact in that a drive demand is smaller than a predetermined value, e.g., a drive demand signal is not outputted form a cruise control system for keeping a vehicle speed to a predetermined speed; a fact in that a speed of the engine 1 is higher than a predetermined reactivatable lower limit speed, and so on. Therefore, in case the speed of the engine 1 is lowered to the reactivatable lower limit speed, the fuel-cut control is terminated and the delivery of fuel to the engine 1 is restarted.

Figure 19:
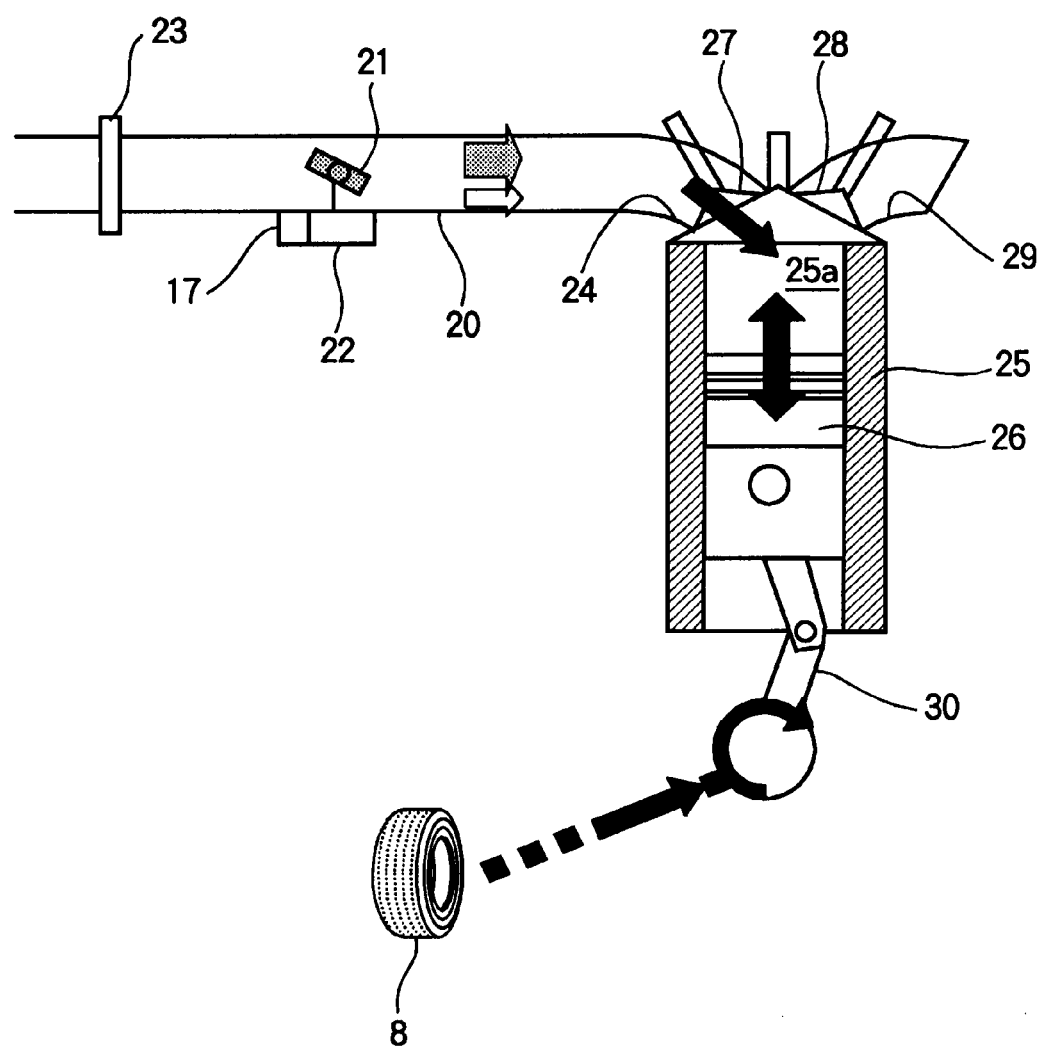
FIG. 19 is a view schematically showing an example of a structure of the engine shown in FIG. 18.

As described, in case the engine 1 is rotated under the situation in which the delivery of the fuel is stopped, a power loss (mainly pumping loss) of the engine 1 is reduced by increasing an air intake. That is, the engine 1 is an internal combustion engine such as a gasoline engine and a diesel engine, and the gasoline engine is used in this example. FIG. 19 is a view schematically showing a structure of the engine 1. As shown in FIG. 19, a throttle valve 21 is arranged in an intake pipe 20 to control an air intake of the engine 1 by changing an opening degree thereof. The throttle valve 21 is actuated by a throttle actuator 22 which is controlled electrically, and a throttle sensor 17 is arranged to detect an opening degree of the throttle valve 21 and to output the detected value. Specifically, a conventional electronic throttle valve is used as the throttle valve 21. In addition, an air sensor 23 is arranged in the intake pipe 20 to detect an amount of air flowing through the intake pipe 20 and to output the detection value. In the example shown in FIG. 19, the air sensor 23 is arranged in an upstream side of the throttle valve 21, however, the air sensor may also be arranged in a downstream side of the throttle valve 21.

In the engine 1 shown in FIG. 19, the fuel is injected to a suction port 24 or a cylinder (i.e., a combustion chamber) 25, and a piston 26 is arranged in the cylinder 25 in a manner to reciprocate therein. Therefore, a combustion chamber 25a is formed in the cylinder 25 by the piston 26, and the combustion chamber 25a thus formed is communicated with the intake pipe 20 through the suction port 24 by opening an intake valve 27. The combustion chamber 25a is also communicated with an exhaust port 29 by opening an exhaust valve 29. A reciprocating motion of the piston 26 is converted into a rotational motion of the crank shaft 2 through a connecting rod 30. As described, the transmission 3 for changing the torque of the engine 1 according to the speed change ratio is connected with the crank shaft 2.

Therefore, in case of carrying out the fuel-cut control, the piston 26 is reciprocated compulsory by an inertia force of the running vehicle. In this situation, if a sectional area for letting through the air in the intake pipe 20 is increased by increasing the opening degree of the throttle valve 21, a pressure in the intake pipe 20 is equalized to an atmospheric pressure. As a result, an amount of air to be supplied to the combustion chamber 25a is increased. That is, a load of an intake stroke is lightened thereby facilitating the reciprocating motion of the piston 26. Thus, the pumping loss (i.e., an engine braking force) of the engine 1 being rotated without delivering the fuel thereto is reduced by increasing an air intake.

The transmission 3 is a conventional continuously variable transmission or a geared transmission configured to change a ratio between an input speed and an output speed thereof arbitrarily. Thus, the power loss (i.e., pumping loss) of the engine 1 may be varied according to the air intake, and the air intake may also be varied continuously. Therefore, it is preferable to use a continuously variable transmission as the transmission 3 which is configured to vary the speed change ratio continuously.

Figure 20:
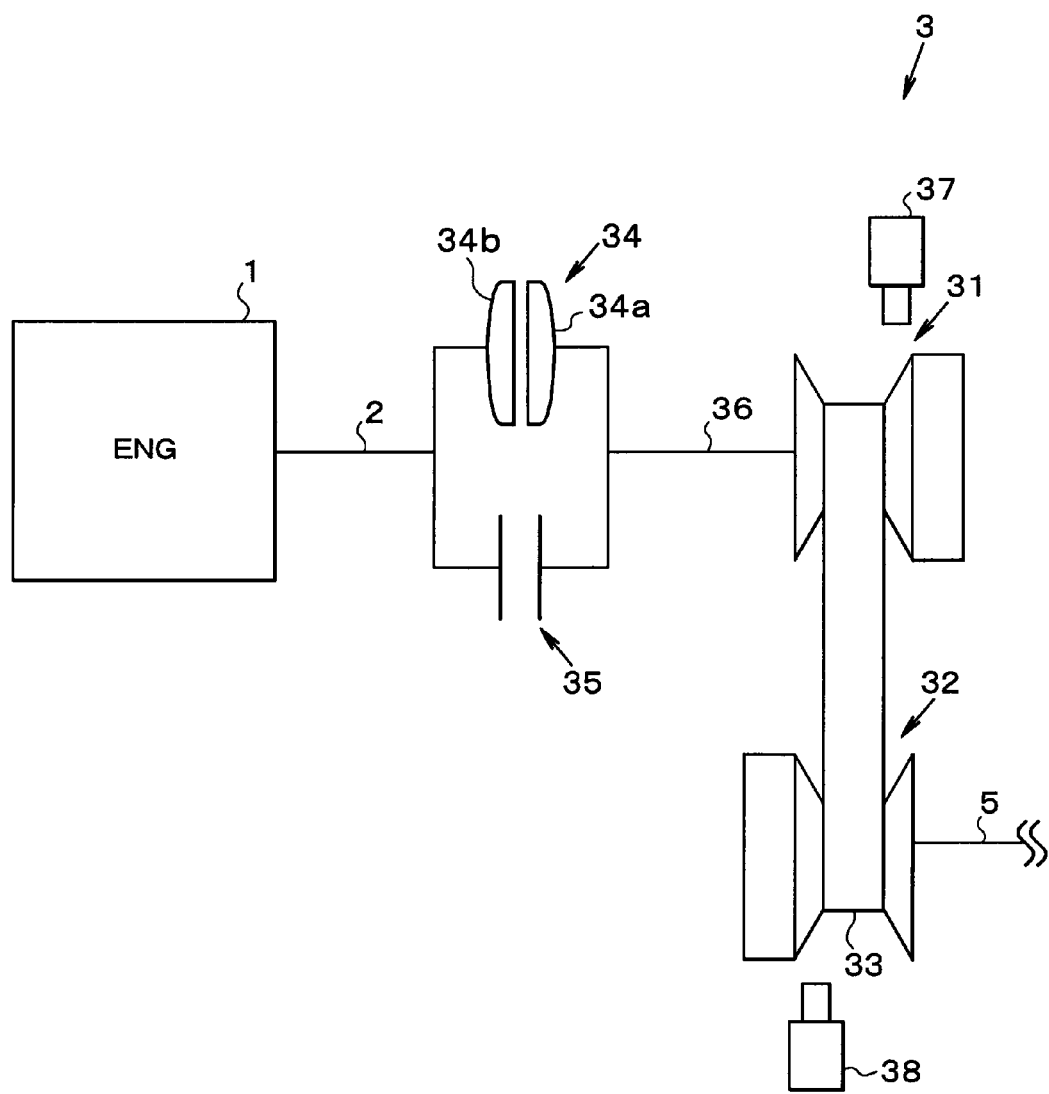
FIG. 20 is a view schematically showing an example of a structure of the belt-type continuously variable transmission.

Specifically, a belt-type continuously variable transmission and a toroidal type continuously variable transmission are suitable for the transmission 3. An example of the belt-type continuously variable transmission is shown in FIG. 20. The transmission 3 shown in FIG. 20 comprises a drive pulley (i.e., a primary pulley) 31, a driven pulley (i.e., a secondary pulley) 32, and a belt 33 applied to those pulleys 31 and 32.

Both of the pulleys 31 and 32 are variable pulley capable of varying a groove width thereof. Therefore, the speed change ratio of the transmission 3, that is, a ratio between speeds of the pulleys 31 and 32 is varied continuously by changing the groove widths of the pulleys 31 and 32 thereby changing running radii of the belt 33 on those pulleys 31 and 32.

Torque of the engine 1 is transmitted to an input element of the transmission 3. However, in the vehicle to which the present invention is applied, the torque of the engine 1 is transmitted indirectly to the transmission 3 through a damper, a torque convertor 34, a clutch and so on. Specifically, in the example shown in FIG. 20, the torque of the engine 1 is transmitted to the transmission 3 through the torque convertor 34 as a fluid transmission mechanism. The torque convertor 34 is a conventional torque converter comprising a lockup clutch 35, a turbine runner 34a functioning as an output member and a pump impeller 34b functioning as an input member. The lockup clutch 35 is configured to connect the output shaft 2 of the engine 1 directly with the input shaft 36 of the transmission 3. Specifically, the lockup clutch 35 is configured to be completely engaged to transmit the torque, and completely disengaged to cut-off the torque transmission. In addition, the lockup clutch 35 is also capable of transmitting the torque while slipping in case it is not engaged completely. Alternatively, a fluid coupling incapable amplifying the torque may also be used instead of the torque converter 34. However, in this case, it is also preferable for the fluid coupling to be provided with the lockup clutch 35.

The turbine runner 34 functioning as an output member of the torque converter 34 is connected with an input shaft 36 of the transmission 3. The input shaft 36 is configured to be rotated integrally with the primary pulley 31, and an input speed sensor 37 is arranged to detect a sped of the input shaft 36 as an input speed of the transmission 3. The input speed detected by the input speed sensor 37 is outputted from the input speed sensor 37. Meanwhile, an output shaft (i.e., a propeller shaft) 5 is connected with the secondary pulley 32 of the transmission 3 in a manner to be rotated therewith, and an output speed sensor 38 is arranged to detect a sped of the output shaft 5 as an output speed of the transmission 3. The output speed detected by the output speed sensor 38 is outputted from the output speed sensor 38.

Figure 21:
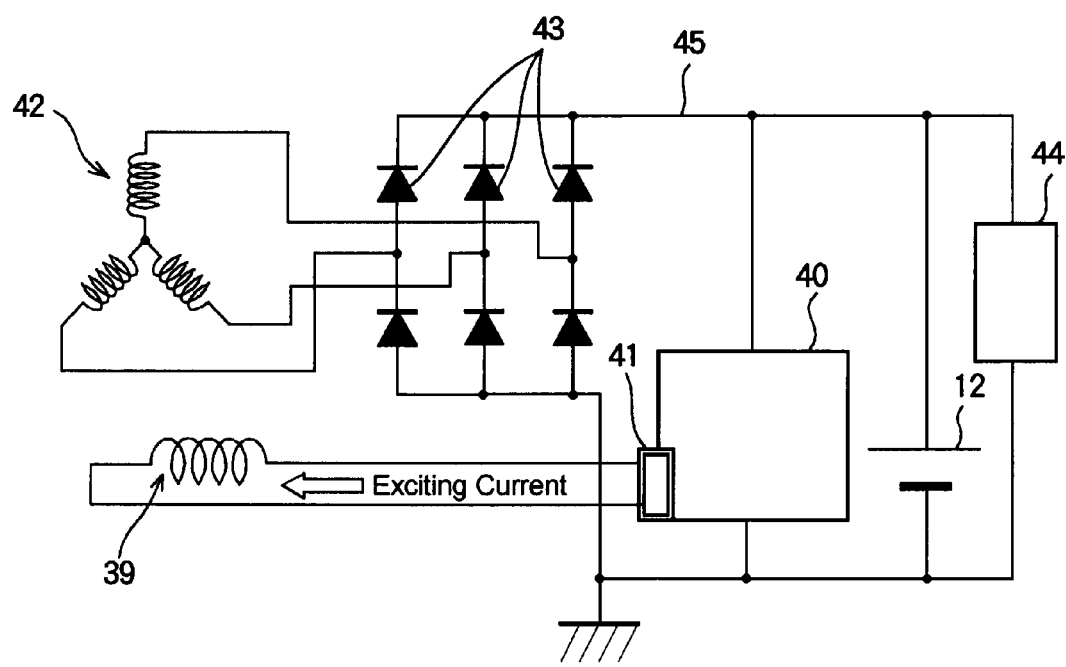
FIG. 21 is an electric circuit of the alternator used in the present invention.

A generating amount of the alternator 10 can be varied by controlling the exciting current applied to a rotor coil 39 twisting around a rotor shaft, or by controlling the voltage command. Therefore, both of a conventional voltage control type alternator, and a LIN alternator configured to be controlled by any of the exciting current and the voltage command may be used in the vehicle to which the present invention is applied. FIG. 21 is an electric circuit of the LIN alternator 10. A generating amount of the LIN alternator 10 shown in FIG. 21 can be controlled electrically. For this purpose, a LIN regulator 40 is arranged to output a command value of the exciting current (or voltage) applied to the rotor coil 39. The exciting current established based on the command value outputted from the LIN regulator 40 is applied to the rotor coil 39 through a slip ring 41.

A plurality of pole cores (not shown) are arranged in an outer circumferential side of the rotor coil 39 to produce a magnetic field. In addition, a stator coil 42 is arranged in a manner to across the magnetic field produced by the pole cores. Therefore, an alternating current is generated on the stator coil 42. The alternating current thus generated on the stator coil 42 is rectified into a direct current by a semiconductor rectifier cell (i.e., a rectifier diode) 43, and stored in the battery 12. In addition, an electrical load 44 such as a headlight, a wiper, a blower motor or the like is connected with the electric circuit shown in FIG. 21.

Figure 22:
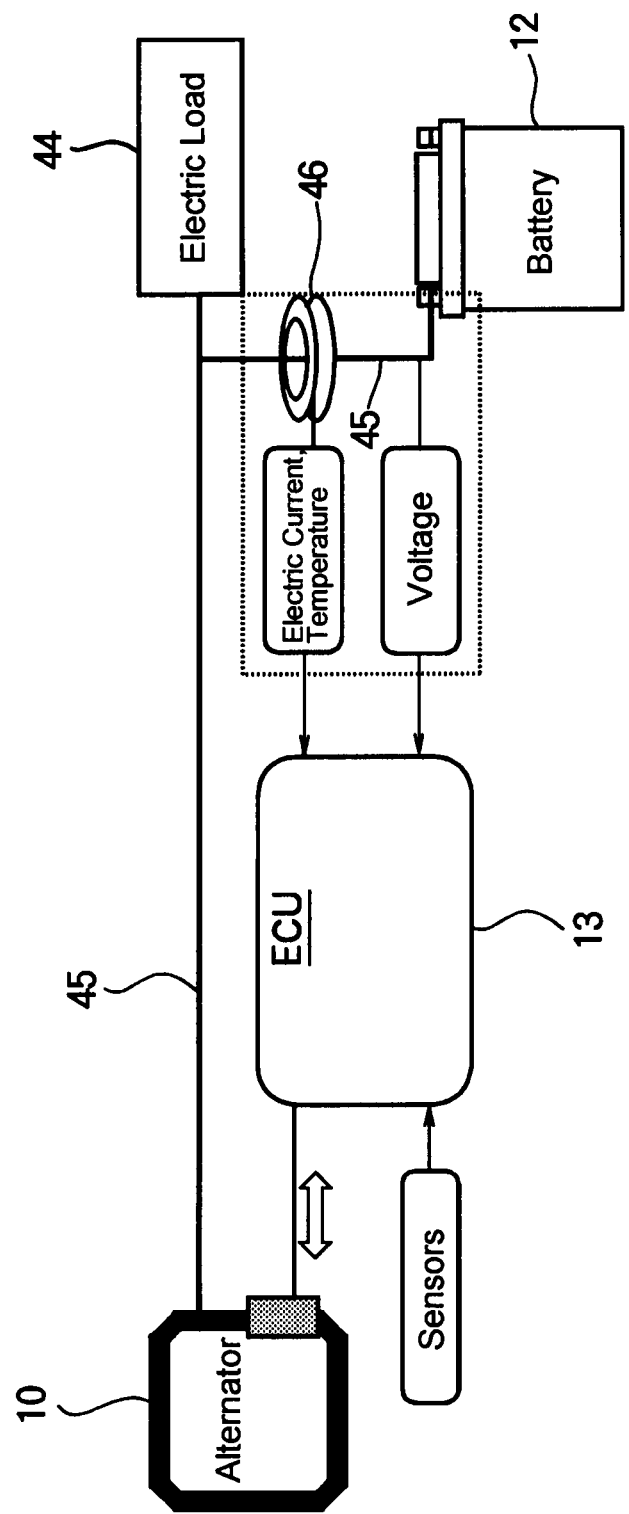
FIG. 22 is a view schematically showing a control system of the alternator used in the present invention.

FIG. 22 is a view schematically showing a control system of the LIN alternator 10. As described, the battery 12 is configured to store the electricity generated by the LIN alternator 10, and the electrical load 44 such as the headlight or the like is activated by the electric power supplied from the battery 12. As shown in FIG. 22, the battery 12 and the electrical load 44 are connected with the LIN alternator 10 through a voltage line 45, and a current sensor (or a temperature sensor) 46 is arranged between the battery 12 and the electrical load 44. Specifically, the current sensor 46 is configured to detect a current (A) from the battery 12 for activating the electrical load 44, and to transmit a detection signal to the ECU 13. The battery 12 is provided with a voltage sensor (not shown), which is configured to detect a voltage (V) from the battery 12, and to transmit a detection signal to the ECU 13. Therefore, the ECU 13 calculates a state of the battery 12 (that is, a state of charge and a state of discharge) based on the detection signals. As described, the detection signals from the aforementioned sensors representing conditions of the vehicle are inputted to the ECU 13, and the ECU 13 judges a driving condition of the vehicle based on the signals inputted thereto. In addition, the LIN regulator 40 is configured to transmit a detection signal of generation amount of the alternator 10 to the ECU 13. Therefore, the ECU 13 carries out a calculation based on the signals inputted thereto, and outputs a control signal based on the calculation result to the LIN regulator 40 thereby controlling the exciting current for controlling the generating amount of the alternator 10.

As described, the control system according to the present invention is configured to stop the delivery of fuel to the engine 1 upon the satisfaction of the aforementioned predetermined conditions. Specifically, the above-mentioned so-called "fuel-cut control" is executed in coordination with the controls of the air intake, speed change ratio and the lockup clutch 35. Basically, the fuel-cut control is executed upon the satisfaction of all the aforementioned preconditions and the execution condition. Specifically, the fuel-cut control is carried out in case an accelerator pedal (not shown) is not depressed deeply so that the drive demand is smaller than the predetermined value, and a speed of the engine 1 is higher than a predetermined reactivatable lower limit speed. During execution of the fuel-cut control, the lockup clutch 35 is engaged under the condition in which the vehicle speed is relatively high. The vehicle speed at which the lockup clutch 35 is engaged is determined in a map in a manner to reduce uncomfortable feeling resulting from vibrations and noises generated by engaging the lockup clutch 35.

In case a mechanical continuously variable transmission such as a belt type continuously variable transmission and a toroidal type continuously variable transmission is used as the transmission 3, the speed change ratio thereof is difficult to be varied when the vehicle is not running. In this case, therefore, the speed change ratio of the transmission 3 is increased gradually to the low speed side during deceleration of the vehicle. Such control to increase the speed change ratio is also carried out even in case the fuel-cut control is being carried out during deceleration of the vehicle. In this situation, deceleration resulting from a power loss (i.e. an engine braking force) of the engine 1 is increased by thus increasing the speed change ratio of the transmission 3. As a result, the engine speed is raised and kept to be higher than the reactivatable lower limit speed so that the execution time of the fuel-cut control can be extended as long as possible. Specifically, the power loss of the engine 1 includes a pumping loss resulting from sucking air into the engine 1 and emitting compressed air from the engine 1, a friction loss, a load of driving the auxiliary devices and so on.

In order to prevent the vehicle from being decelerated more than necessary while increasing the speed change ratio before a termination of the fuel-cut control, or in order to keep a jerk during deceleration constant, the vehicle control system according to the present invention reduces the pumping loss of the engine 1 when the speed change ratio is being increased during execution of the fuel-cut control. Specifically, the air intake of the engine 1 is increased during execution of the fuel-cut control by increasing an opening degree of the throttle valve 21 gradually. At the same time, the torque of the engine 1 is also increased by reducing a load to drive the auxiliary devices, e.g., by reducing a generating amount of the alternator 10. In case an idle speed control valve is arranged in parallel with the main throttle valve 21 in the engine 1, air intake of the engine 1 may be increased by increasing an opening degree of the idle speed control valve. Alternatively, the air intake of the engine 1 may also be increased by increasing opening degrees of both of the main throttle valve 21 and the idle speed control valve. In addition, in case a timing to actuate the intake valve 27 of the engine 1 is allowed to be changed, the air intake of the engine 1 may also be increased by extending a time of opening the intake valve 27.

Figure 1:
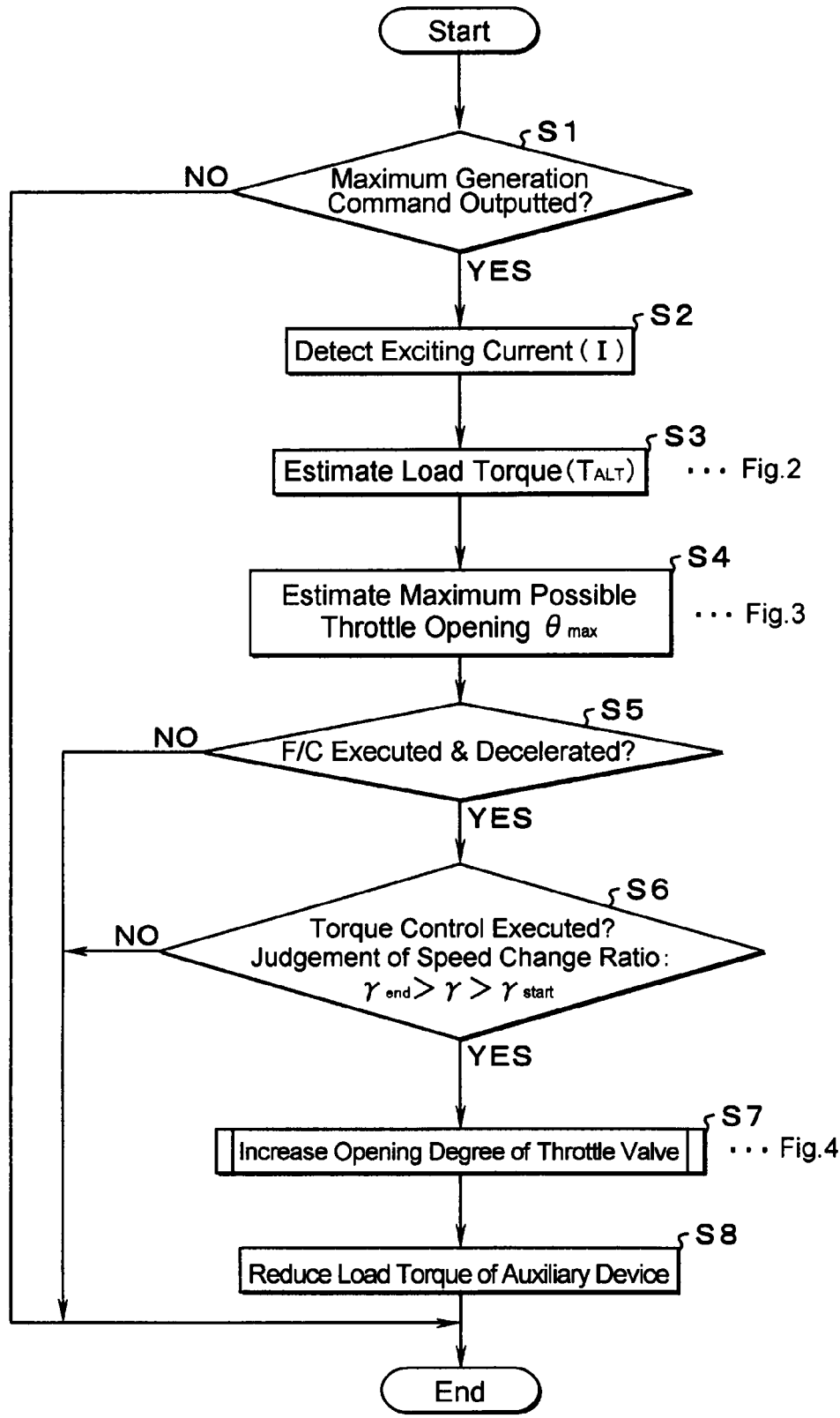
FIG. 1 is a flowchart explaining an example of a control for increasing an air intake of the engine and reducing a load of the auxiliary device while increasing a speed change ratio of the transmission.

FIG. 1 is a flowchart explaining a control example for increasing an air intake of the engine 1 while reducing a load of the auxiliary device applied to the engine 1, during execution of the fuel-cut control while of increasing a speed change ratio $\gamma$ of the transmission 3. The routine shown in FIG. 1 is executed repeatedly in a predetermined short cycle while the vehicle is running. First of all, it is judged whether or not a maximum generation command is outputted to the alternator 10 (at step S1). Specifically, it is judged whether or not the alternator 10 is required to generate a maximum possible electric power. In case the alternator 10 outputs the maximum power, the generated electric power is charged into the battery 12, and the maximum load torque of the alternator 10 is applied to the engine 1.

Figure 2:
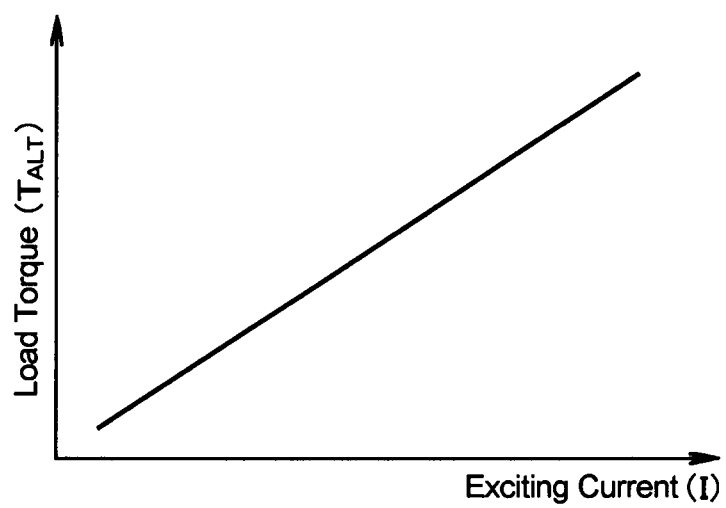
FIG. 2 is an example of a map for estimating a load torque of the alternator based on an exciting current.

In case the maximum generation command is outputted to the alternator 10 so that the answer of step S1 is YES, an exciting current value (I) outputted to the alternator 10, or an actual pulse width modulation (PWM) outputted form the alternator 10 is detected (at step S2). Then, a load torque $T_{ALT}$ of the alternator 10 to be applied to the engine 1 is estimated based on the detected exciting current value (I) or actual pulse width modulation (PWM) (at step S3). FIG. 2 is an example of a map used to estimate the load torque $T_{ALT}$, and as shown in FIG. 2, the load torque $T_{ALT}$ of the alternator 10 is increased in proportional to an increase in the exciting current value (I) inputted to the alternator 10. Such relation between the load torque $T_{ALT}$ and the exciting current value (I) may be determined in advance according to a configuration of the alternator 10. Alternatively, the map shown in FIG. 2 may also be prepared based on actual measurement data and so on. Thus, the load torque $T_{ALT}$ is estimated based on the detected exciting current value (I) with reference to the map shown in FIG. 2. The load torque $T_{ALT}$ thus estimated at step S3 is to be applied to the engine 1 after the termination of the fuel-cut control thereby suppressing an abrupt increase in the acceleration of the vehicle.

Figure 3:
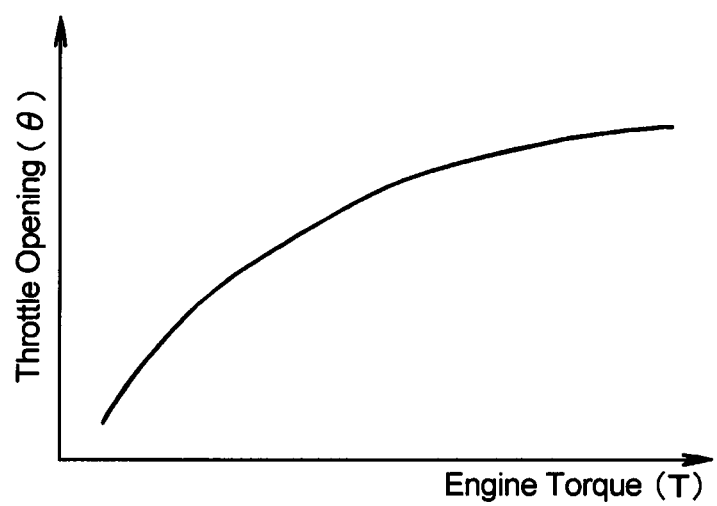
FIG. 3 is an example of a map determining a relation between the engine torque and a maximum possible opening degree of the throttle valve for reducing a pumping loss.

Then, maximum possible opening degree $\theta_{MAX}$ of the throttle valve 21 to reduce the pumping loss is estimated (at step S4). In case the throttle valve 21 is opened to the maximum possible opening degree $\theta_{MAX}$, the pumping loss of the engine 1 can be reduced according to the maximum possible opening degree $\theta_{MAX}$. FIG. 3 is an example of a map used to estimate the maximum possible opening degree $\theta_{MAX}$. As shown in FIG. 3, the maximum possible opening degree $\theta_{MAX}$ is determined according to the engine torque. Therefore, the maximum possible opening degree $\theta_{MAX}$ to reduce the pumping loss can be estimated based on the torque of engine 1 with reference to FIG. 3. Specifically, a resistance to rotate the engine 1 is reduced in accordance with an increase in the maximum possible opening degree $\theta_{MAX}$. Therefore, a possible reduction amount of the pumping loss of the engine 1 can be estimated by thus estimating the maximum possible opening degree $\theta_{MAX}$ based on the engine torque.

Then, it is judged whether or not the vehicle is decelerated while carrying out the fuel-cut control (at step S5). As described, the fuel-cut control is executed upon the satisfaction of all the aforementioned preconditions and the execution conditions. Therefore, the execution of the fuel-cut control can be judged on the basis of the satisfaction of those conditions. In case all of the preconditions and the execution conditions are satisfied, the fuel-cut computer (not shown) outputs a signal for stopping the delivery of fuel to the engine 1, and this situation is notified to the ECU 13. Therefore, the execution of the fuel-cut control may also be judged on the basis of the data transmitted to the ECU 13. Meanwhile, the deceleration of the vehicle can be judged on the basis of the detection signal from the acceleration sensor 16, or on the basis of the detection signal from the wheel speed sensor 15.

In case the fuel-cut control is carried out during deceleration of the vehicle so that the answer of step S5 is YES, it is judged whether or not a torque control is carried out by increasing the speed change ratio $\gamma$ of the transmission 3 (at step S6). As described, in case a mechanical continuously variable transmission such as a belt type continuously variable transmission or a toroidal type continuously variable transmission is used as the transmission 3, the speed change ratio thereof is difficult to be varied if the vehicle is not running. Therefore, in order to reaccelerate the vehicle, and in order to avoid an engine stall, the speed change ratio $\gamma$ of the transmission 3 is increased gradually to the low speed side during deceleration of the vehicle even if the fuel cut-control is being carried out. Specifically, in this situation, the speed change ratio $\gamma$ of the transmission 3 is increased to a ratio $\gamma_{end}$ possible to restart the vehicle. That is, the judgment of step S6 is carried out to judge whether or not the speed change ratio $\gamma$ is being increased. Specifically, it is judged whether or not the current speed change ratio $\gamma$ is increased to be larger than the speed change ratio $\gamma_{start}$ at the commencement of the routine shown in FIG. 1.

In case the speed change ratio $\gamma$ is being increased so that the answer of step S6 is YES, a control to increase the opening degree of the throttle valve 21 is carried out (at step S7). As described, the deceleration utilizing the pumping loss (i.e., the engine braking force) of the engine 1 is increased by increasing the speed change ratio $\gamma$ of the transmission 3. Therefore, in order to reduce the pumping loss of the engine 1, air intake of the engine 1 is increased at step S7 by increasing the opening degree of the throttle valve 21.

Then, the load torque $T_{ALT}$ of the alternator 10 applied to the engine 1 is reduced (at step S8). That is, in addition to reduce the pumping loss of the engine 1 at step S7 by thus increasing the air intake thereto, a load on the engine 1 to drive the auxiliary device is reduced at step S8 thereby preventing the vehicle to be decelerated excessively before the termination of the fuel-cut control. For this purpose, specifically, the load torque $T_{ALT}$ of the alternator 10 is reduced by controlling the exciting current applied thereto.

In case the maximum generation command is not outputted to the alternator 10 so that the answer of step S1 is NO, in case the fuel-cut control is not carried out during deceleration of the vehicle so that the answer of step S5 is NO, or in case the speed change ratio γ of the transmission 3 is not increased so that the answer of step S6 is NO, the routine is returned without carrying out any specific control.

Figure 4:
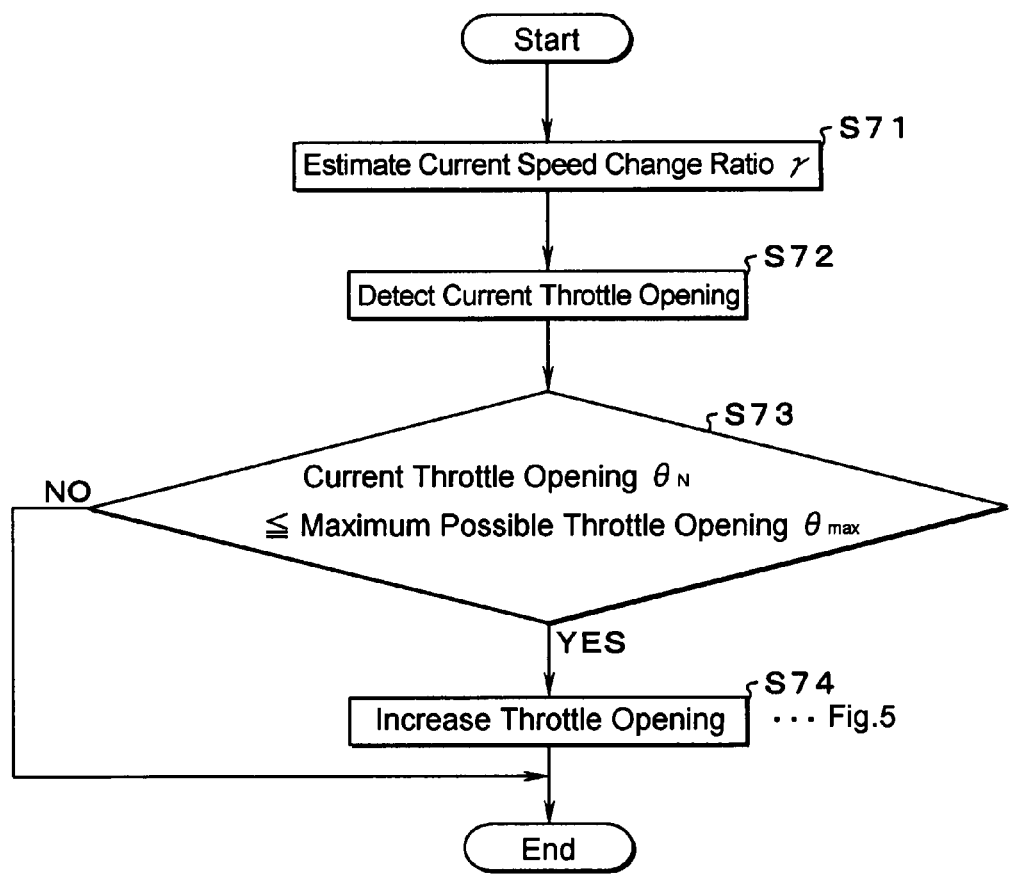
FIG. 4 is a flowchart explaining an example of increasing the opening degree of the throttle valve.

FIG. 4 is a flowchart showing an example of a subroutine to increase the opening degree of the throttle valve 21 at the aforementioned step S7. The subroutine shown in FIG. 4 is also executed repeatedly in a predetermined short cycle while the vehicle is running. First of all, current speed change ratio γ of the transmission 3 is estimated (at step S71). Specifically, the current speed change ratio γ can be estimated based on the current vehicle speed with reference to a speed change diagram or a map. In addition, current opening degree $\theta_N$ of the throttle valve 21 is detected (at step S72). Then, it is judged whether or not the current opening degree $\theta_N$ of the throttle valve 21 is smaller than the maximum possible opening degree $\theta_{MAX}$ (at step S73). That is, at step S73, it is judged whether or not the pumping loss is still possible to be reduced by increasing the opening degree θ of the throttle valve 21.

Figure 5:
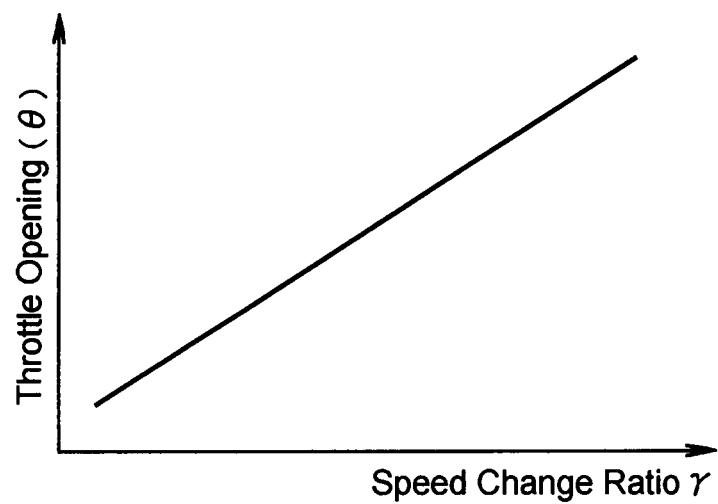
FIG. 5 is an example of a map for increasing the opening degree of the throttle valve according to the speed change ratio.

In case the current opening degree $\theta_N$ is smaller than the maximum possible opening degree $\theta_{MAX}$ so that the answer of step S73 is YES, the opening degree θ of the throttle valve 21 is increased (at step S74). Specifically, at step S74, the pumping loss is reduced by increasing the opening degree θ of the throttle valve 21 while increasing the speed change ratio γ, and as shown in FIG. 5, the opening degree θ is increased in proportion to an increase in the speed change ratio γ. Therefore, the opening degree θ with respect to the speed change ratio γ can be calculated with reference to the map shown in FIG. 5. However, a timing at which the actual air intake is changed is delayed inevitably from a timing at which the opening degree θ of the throttle valve 21 is changed. Therefore, the opening degree θ of the throttle valve 21 is preferable to be changed with respect to the speed change ratio γ while being corrected in a manner to avoid the above-explained delay at around the timing when started to be increased or when terminated to be increased, instead of being changed linearly with respect to the speed change ratio γ. In addition, the opening degree θ of the throttle valve 21 may also be changed in a curved manner with respect to the speed change ratio γ according to the required characteristic of the control or vehicle, instead of being changed linearly.

To the contrary, in case the current opening degree $\theta_N$ of the throttle valve 21 is larger than the maximum possible opening degree $\theta_{MAX}$ so that the answer of step S73 is NO, the routine is returned without carrying out any specific control.

After thus reducing the pumping loss of the engine 1 at aforementioned step S7 by carrying out the control shown in FIG. 4 to increase the opening degree θ of the throttle valve 21, the load torque of the auxiliary device such as the alternator 10 applied to the engine 1 is lightened at aforementioned step S8. That is, the increase in deceleration of the vehicle resulting from increasing the speed change ratio γ is offset by thus reducing the pumping loss of the engine 1 and the load torque of the auxiliary device applied to the engine 1.

Next, controls to be carried out after the termination of fuel-cut control will be explained hereinafter. The control system according to the present invention is configured to restart the delivery of fuel to the engine 1 upon dissatisfaction of the aforementioned preconditions and execution conditions. For example, in case the drive demand is larger than the predetermined value, in case the engine speed is lower than the predetermined reactivatable lower limit speed, the fuel-cut control is terminated and the delivery of fuel to the engine 1 is restarted. Therefore, a point of time when the fuel-cut control is terminated can be detected based on the fact in that the engine speed is reduced to be lower than the reactivatable lower limit speed, or based on the fact in that the lockup clutch 35 is disengaged prior to terminate the fuel-cut control.

As described, the vehicle is decelerated before the termination of the fuel-cut control, and in this situation, the opening degree θ of the throttle valve 21 is increased to increase the air intake of the engine 1 for the purpose of reducing the pumping loss of the engine 1. Thus, the air intake of the engine 1 is increased before the termination of the fuel-cut control in comparison with the air intake of the case in which the engine 1 is idling. If the fuel is delivered to the engine 1 configured to control an air-fuel ratio under the situation in which the augmentation of deceleration of the vehicle is thus suppressed by increasing the air intake of the engine 1, the torque to be generated by the engine 1 when the delivery of fuel thereto is restarted may be raised excessively.

Therefore, in order to prevent abrupt acceleration of the vehicle, that is, in order to suppress an augmentation in the acceleration of the vehicle after the termination of the fuel-cut control, the control system according to the present invention is configured to suppress the torque of the engine 1 by increasing the load torque of the auxiliary device applied to the engine 1 when the fuel-cut control is terminated. For this purpose, specifically, the load torque $T_{ALT}$ (i.e., a generation amount) of the alternator 10 is increased.

Figure 6:
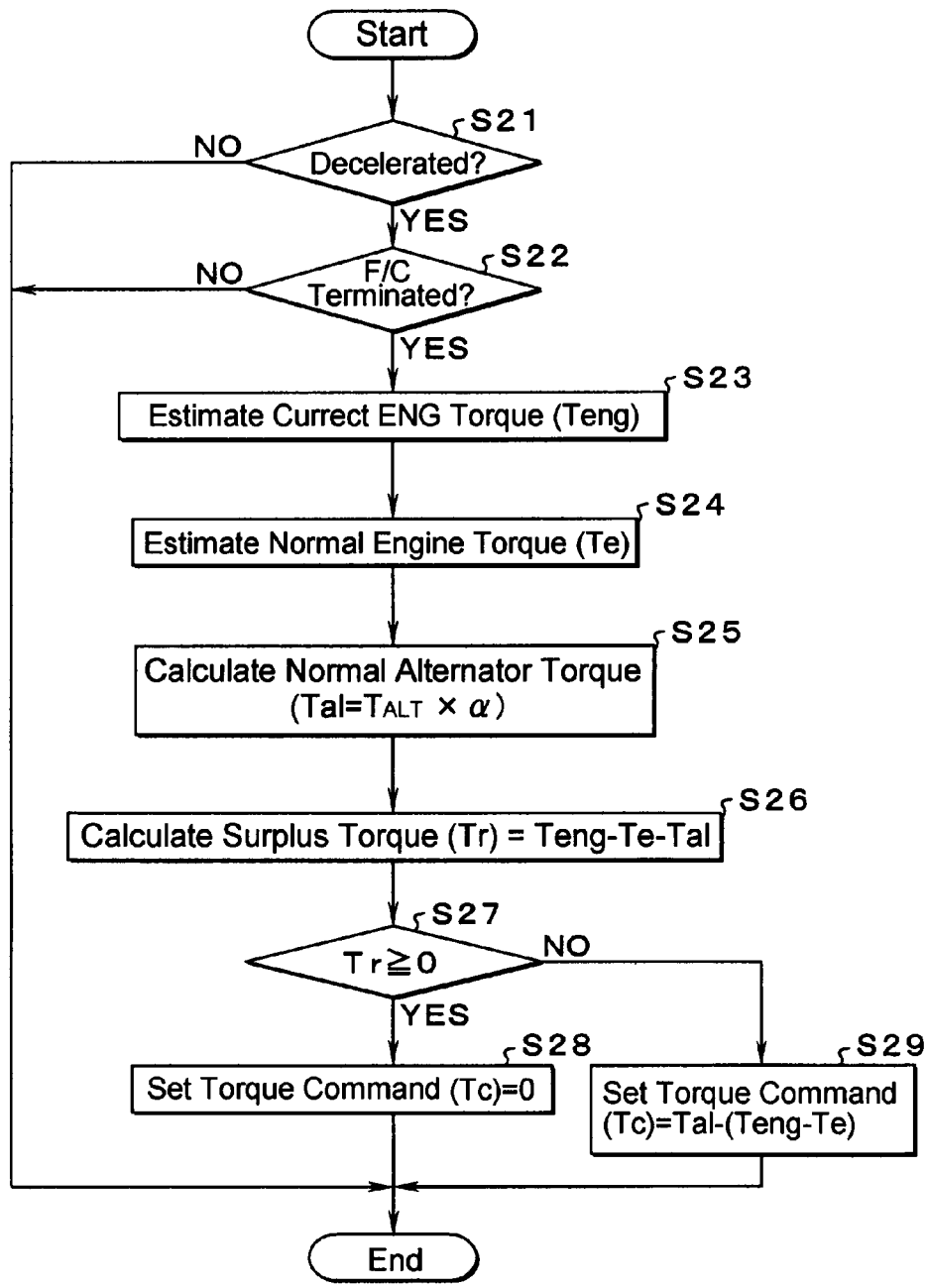
FIG. 6 is a flowchart explaining an example of controlling the engine torque when the fuel-cut control is terminated.

FIG. 6 is a flowchart showing a control example to increase the load torque $T_{ALT}$ to drive the alternator 10 applied to the engine 1. The routine shown in FIG. 6 is also executed repeatedly in a predetermined short cycle while the vehicle is running. First of all, it is judged whether or not the vehicle is decelerated (at step S21). The judgment of step S21 can be made on the basis of the vehicle speed, the acceleration of the vehicle, or an opening degree of the accelerator. In case the vehicle is being decelerated so that the answer of step S21 is YES, it is judged whether or not the fuel-cut control is terminated (at step S22). As described, the fuel-cut control is commenced upon the satisfaction of the aforementioned preconditions and the execution conditions. Therefore, the termination of the fuel-cut control is judged based on a dissatisfaction of any of those preconditions and the execution conditions.

In case the fuel-cut control has already been terminated so that the answer of step S22 is YES, the current engine torque $T_{eng}$ is estimated (at step S23). Specifically, the current estimated engine torque $T_{eng}$ is a torque generated by delivering fuel to the engine 1 under the condition in which the air intake of the engine 1 is increased to reduce the pumping loss. Therefore, the current engine torque $T_{eng}$ can be estimated based on the opening degree θ of the throttle valve 21 increased at the above-explained step S7 shown in FIG. 1.

Then, a normal engine torque Te is calculated (at step S24). Specifically, the normal engine torque Te is a torque of the running vehicle to be generated under the condition in which the air is not supplied excessively to the cylinder 25, and the above-explained control to reduce the load torque of the auxiliary device is not executed. That is, the normal engine torque Te is the torque generated by the engine 1 in case the controls of steps S7 and S8 of the present invention are not carried out. Therefore, the normal engine torque Te is estimated based on the opening degree θ of the throttle valve 21 and the load torque $T_{ALT}$ of the auxiliary device under the normal condition. In case the driving force is not demanded, the idling torque of the engine 1 is used as the normal engine torque Te.

Then, a normal load torque $T_{al}$ of the alternator 10 is calculated (at step S25). Basically, the auxiliary device such as the alternator 10 generates the electric power constantly, therefore, the load torque of the alternator 10 applied to the engine 1 is constant under the normal situation. However, according to the present invention, the voltage command value outputted to the alternator 10 is changed before and after the termination of the fuel-cut control. As described, the load torque $T_{ALT}$ of the alternator 10 calculated at step S3 is the estimated torque of the case in which the maximum voltage command is outputted to the alternator 10. Therefore, the load torque of the alternator 10 is changed after the termination of the fuel-cut control by changing the voltage command value applied thereto. In this case, specifically, the normal load torque $T_{al}$ of the alternator 10 under the normal situation after the termination of the fuel-cut control is calculated by multiplying the load torque $T_{ALT}$ by a factor α as expressed by the following formula ($T_{al} = T_{ALT} \cdot \alpha$) where α represents a factor for adjusting a difference between the voltage command value during the execution of the fuel-cut control and the voltage command value after the termination of the fuel-cut control. For this purpose, the factor α is obtained by dividing the voltage command value after the termination of the fuel-cut control by the maximum voltage command value.

After thus obtaining the current estimated torque $T_{eng}$ of the engine 1 after the termination of the fuel-cut control, the normal torque Te of the engine 1, and the normal load torque $T_{al}$ of the alternator 10, a surplus (i.e., excessive) engine torque Tr is calculated (at step S26). Specifically, the surplus torque Tr is a surplus amount of the torque which increases the speed of the engine 1 more than necessary after the termination of the fuel-cut control. For example, the surplus torque Tr can be calculated by subtracting the normal torque Te of the engine 1 and the normal load torque $T_{al}$ of the alternator 10 from the estimated current torque $T_{eng}$ of the engine 1, as expressed by the following formula:

$$Tr = T_{eng} - Te - T_{al}.$$

Then, it is judged whether or not the surplus torque Tr thus calculated is larger than a predetermined threshold, e.g., larger than 0 (at step S27). Specifically, the judgment at step S27 is carried out to judge an existence of the surplus torque Tr which increases the acceleration of the vehicle just after the termination of the fuel-cut control. In case the surplus torque Tr is larger than zero so that the answer of step S27 is YES, a torque command Tc applied to the engine 1 to drive the alternator 10 is set to zero (at step S28). That is, the torque command Tc is a part of the torque command inputted to the engine 1 for driving the alternator 10, and the torque command Tc is reduced to zero just after the termination of the fuel-cut control in case the surplus torque Tc is generated by the engine 1. In this case, therefore, the torque command value for driving the engine 1 is reduced after the termination of the fuel-cut control by thus reducing the torque command Tc for driving the alternator 10. As a result, an augmentation of the acceleration of the vehicle after the termination of the fuel-cut control can be suppressed even in case the surplus torque Tr is generated.

To the contrary, in case the answer of step S27 is NO, the torque command Tc as a part of the torque command of the engine 1 for driving the alternator 10 is calculated (at step S29) using the following formula:

$$Tc = T_{a1} - (T_{eng} - Te) \qquad (1).$$

In this case, as can be seen form the above formula (I), the torque command Tc is calculated by subtracting a difference between the estimated engine torque $T_{eng}$ and the normal engine torque Te from the normal load torque $T_{al}$ of the alternator 10. In case the answer of step S27 is NO, the air intake of the engine 1 is increased to reduce the pumping loss, however, the torque of the engine 1 is rather small in this case. Therefore, in this case, if the engine 1 drives the alternator 10 properly after the termination of the fuel-cut control, an engine stall may by caused due to such shortage of the engine torque. In order to compensate such shortage of the engine torque, the torque command Tc is increased using the above formula (I) in this case.

Meanwhile, in case the vehicle is accelerated so that the answer of step S21 is NO, or in case the fuel-cut control is being carried out so that the answer of step S22 is NO, the routine is returned without carrying out any specific control.

Figure 7:
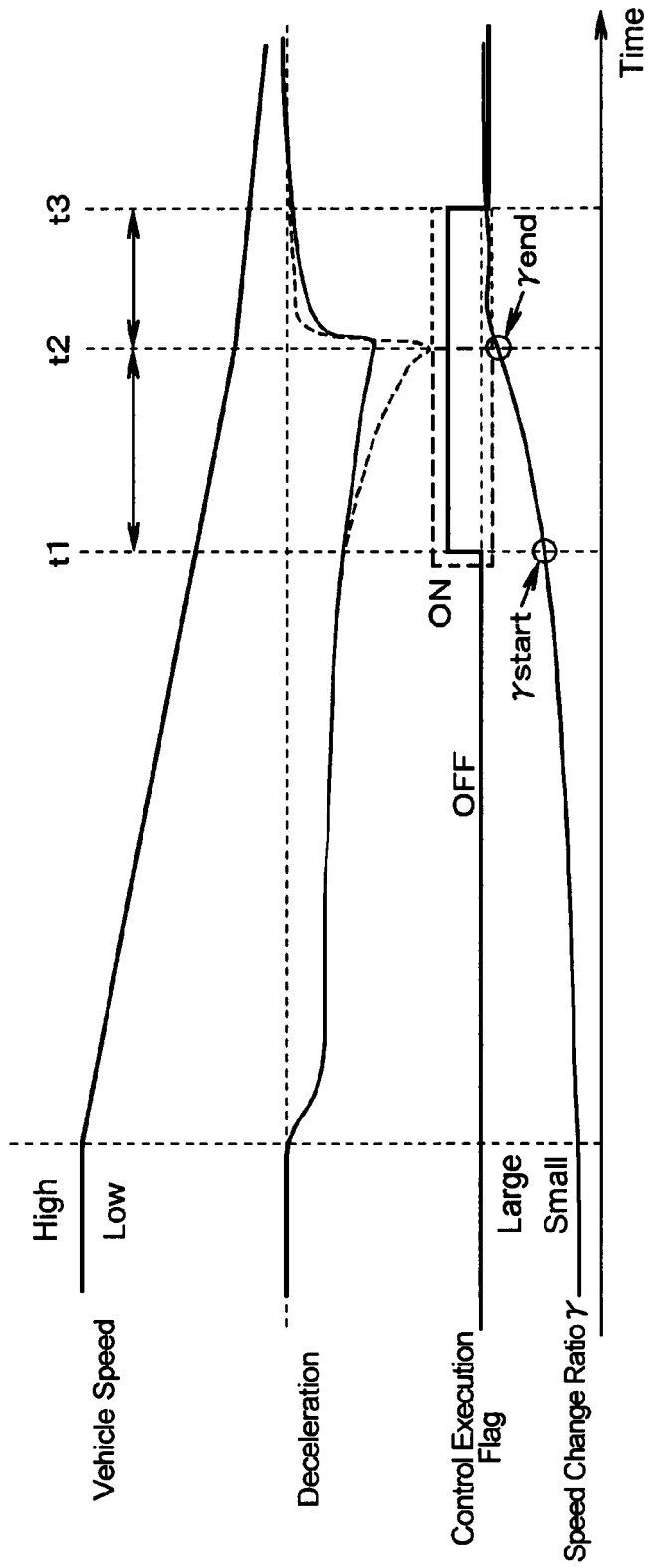
FIG. 7 is a time chart schematically indicating changes in the acceleration, speed etc. of the vehicle in case of carrying out the controls shown in FIGS. 1, 4 and 6.

FIG. 7 is a time chart indicating changes in the deceleration of the vehicle, the vehicle speed and so on in case of carrying out the controls shown in FIGS. 1, 4 and 6. In FIG. 7, solid lines indicate changes in those factors of the case in which the controls according to the present invention are carried out, and broken line indicate longitudinal acceleration such as deceleration and acceleration of the case in which the controls according to the present invention are not carried out. Before the time point t1, the vehicle is decelerated while engaging the lockup clutch 35 and carrying out the fuel-cut control. In this situation, the speed change ratio γ is increased gradually to the low speed side with a reduction in the vehicle speed. Therefore, an axial torque of the engine 1 is negative in this situation so that the deceleration of the vehicle is increased to the negative side gradually. In other words, the braking force of the vehicle is increased gradually to decelerate the vehicle with an increase in the speed change ratio γ. In this situation, the opening degree θ of the throttle valve 21 is started to be increased gradually in accordance with such increase in the speed change ratio γ at a predetermined time point (t1). In addition, the exciting current value (I) or the voltage command value applied to the alternator 10 is reduced gradually with the increase in the speed change ratio γ, and the load torque $T_{ALT}$ of the alternator 10 is thereby reduced gradually. As described, in case the air intake of the engine 1 is increased, the pumping loss thereof is reduced. In case the load torque $T_{ALT}$ of the alternator 10 as the auxiliary device is thus reduced, the load applied to the engine 1 is lightened. As a result, the axial torque of the engine 1 is increased in the reduction amounts of the pumping loss and load torque of the alternator 10. For this reason, the vehicle will not be decelerated excessively just before the termination of the fuel-cut control.

When the speed of the decelerating vehicle is reduced to the lower limit of a lockup region, the lockup clutch 35 is disengaged (not shown). At the same time, the opening degree θ of the throttle valve 21 is reduced to an idling degree (i.e., an opening degree to execute an Idle Speed Control (ISC)) thereby idling the engine 1. As a result, the pressure in the intake pipe 20 and the axial torque of the engine 1 are reduced gradually. In this situation, however, the air intake and the pressure in the intake pipe 20 are not reduced abruptly. Therefore, the deceleration of the vehicle will not be increased immediately.

After the lockup clutch 35 is thus disengaged, the inertia torque of the running vehicle rotating the engine 1 compulsory is reduced, and the speed of the engine 1 is thereby reduced to the reactivatable lower limit speed. Therefore, the fuel-cut control is terminated at this point, that is, the delivery of fuel to the engine 1 is restarted (at point t2). When the delivery of fuel to the engine 1 is thus restarted, the engine 1 starts outputting a base torque. As a result, the acceleration of the vehicle is increased by the base torque of the engine 1 (i.e., the braking force is reduced).

As described, the engine 1 is a gasoline engine subjected to the air-fuel control. Meanwhile, before the time point t2, that is, before the termination of the fuel-cut control, the air intake of the engine 1 is increased with the increase in the speed change ratio γ to be larger than the intake to keep the engine 1 idling. Therefore, when the fuel-cut control is terminated at the point t2, a feeding amount of the fuel to the engine 1 is increased according the increase in the air intake. As a result, when the delivery of fuel to the engine 1 is restarted, the axial torque of the engine 1 is increased abruptly to be larger than that of the case in which the engine 1 is idling. Thus, after the termination of the fuel-cut control, the surplus torque Tr is generated by the engine 1 in addition to the base torque.

However, before the point t2, the vehicle is still decelerating and the engine 1 is rotated compulsory by the inertia force of the vehicle. Therefore, in this situation, the vehicle is decelerated by the engine braking force. Then, when the delivery of fuel to the engine 1 is restarted at the point t2, the exciting current value (I) applied to the alternator 10 is increased according to an increase in the drive demand, and the load torque $T_{ALT}$ of the alternator 10 applied to the engine 1 is thereby increased. Therefore, the surplus torque Tr thus generated after restarting the delivery of fuel to the engine 1 is offset by the load torque $T_{ALT}$ of the alternator 10 thus increased. That is, the axial torque of the engine 1 is reduced by the load torque $T_{ALT}$ of the alternator 10 thus increased so that the acceleration of the vehicle is thereby dampened. Therefore, the engine 1 will not output the torque in excess of the drive demand even after the termination of the fuel-cut control at the point t2.

Thus, as indicated by the solid lines in FIG. 7, the longitudinal acceleration of the vehicle is not fluctuated significantly before and after the termination of the fuel-cut control. Therefore, according to the present invention, the fuel-cut control can be terminated smoothly and the vehicle can be reaccelerated smoothly after the termination of the fuel-cut control without providing uncomfortable feeling to the driver. On the other hand, according to the comparative example indicated by the broken line, the air intake is not increased before the termination of the fuel-cut control, and the load torque to drive the alternator 10 applied to the engine 1 is not changed after the termination of the fuel-cut control. Therefore, according to the comparative example, the vehicle is decelerated excessively with the increase in the speed change ratio γ before the termination of the fuel-cut control, and the vehicle is accelerated abruptly after the termination of the fuel-cut control by the surplus torque of the engine. As a result, shocks may be caused by the fluctuation of the longitudinal acceleration of the vehicle before and after restarting the delivery of fuel. For this reason, according to the comparative example, the driver may feel uncomfortable feeling and driving comfort is thereby degraded.

In addition to the above-explained advantages, according to the control system of the present invention, the opening degree θ of the throttle valve 21 can be controlled during deceleration of the vehicle on the basis of the load torque of the alternator 10. Therefore, the opening degree θ of the throttle valve 21 can be optimized to increase the air intake of the engine 1 during the fuel-cut control. Moreover, an excessive delivery of the fuel to generate the surplus torque Tr can be prevented by thus optimizing the opening degree θ of the throttle valve 21. Therefore, the fuel will not be consumed wastefully after the termination of the fuel-cut control so that the fuel economy is improved.

The controls shown in FIGS. 1, 4 and 6 are executed by the ECU 13 composed mainly of a microcomputer. Therefore, step S1 may be called as a maximum generation command detecting means, step S2 may be called as an exciting current detecting means, step S3 may be called as a load torque estimating means, step S4 may be called as a maximum throttle opening estimating means, step S5 may be called as a fuel-cut judging means, step S6 may be called as a speed change ratio judging means, step S7 may be called as a throttle opening control means or a pumping loss reducing means, and step S8 may be called as a load torque reducing means.

In the control shown in FIG. 4, step S71 may be called as a speed change ratio detecting means, step S72 may be called as a throttle opening detecting means, step S73 may be called as a throttle opening judging means, and step S74 may be called as a throttle opening control means or a pumping loss reducing means.

In the control shown in FIG. 6, step S21 may be called as a deceleration judging means, step S22 may be called as a fuel-cut judging means, step S23 may be called as an engine torque estimating means, step S24 may be called as a normal engine torque estimating means, step S25 may be called as a normal load torque calculating means, step S26 may be called as a surplus torque calculating means, step S27 may be called as a surplus torque judging means, and step S28 may be called as a load torque control means.

That is, a control system for carrying out the routine shown in FIG. 1 is configured to increase an air intake according to an increase in a speed change ratio during an execution of fuel-cut control, and the control system comprises: a pumping loss reducing means, which suppresses an increase in deceleration of a vehicle by increasing an air intake of an engine, in case the vehicle is decelerated by increasing the speed change ratio during an execution of the fuel-cut control; and a load torque reducing means, which suppresses an increase in the deceleration of the vehicle by reducing a load torque of the alternator, in case the vehicle is decelerated by increasing the speed change ratio during an execution of the fuel-cut control.

The above-mentioned control system further comprises: a surplus torque judging means, which detects a surplus torque boosting the acceleration of the vehicle generated when restarting delivery of fuel to the engine; and a load torque control means, which reduces the surplus torque by controlling the load torque to drive the alternator.

As described, the fuel-cut control is executed under the situation in which the drive demand is smaller than the predetermined value so that the vehicle is decelerating, and in which the engine speed is higher than the predetermined reactivatable lower limit speed. In case the vehicle speed is thus being lowered, the speed change ratio γ is increased to prepare for reaccelerating the vehicle and to prevent an engine stall. Therefore, in case the vehicle speed is lowered to the lower limit of the lockup region and the lockup clutch 35 is thereby disengaged, or in case the fuel-cut control is terminated simultaneously with the disengagement of the lockup clutch 35, the acceleration or deceleration of the vehicle is fluctuated undesirably.

Therefore, in case of reducing the load torque $T_{ALT}$ to drive the alternator 10 by the engine 1 during the execution of the fuel-cut control at aforementioned step S8, it is preferable to change the load torque $T_{ALT}$ to drive the alternator 10 smoothly in accordance with the increase in the speed change ratio γ, thereby reducing a change rate of the longitudinal acceleration (i.e., a jerk) of the vehicle. For this purpose, the control system according to the present invention estimates a speed change ratio $\gamma_{end}$ at a point when the lockup clutch 35 is to be disengaged during a procedure to increase the speed change ratio γ, and to suppress a change in the jerk during deceleration of the vehicle resulting from increasing the speed change ratio γ by reducing the load torque to drive the auxiliary device using the estimated speed change ratio $\gamma_{end}$.

Figure 8:
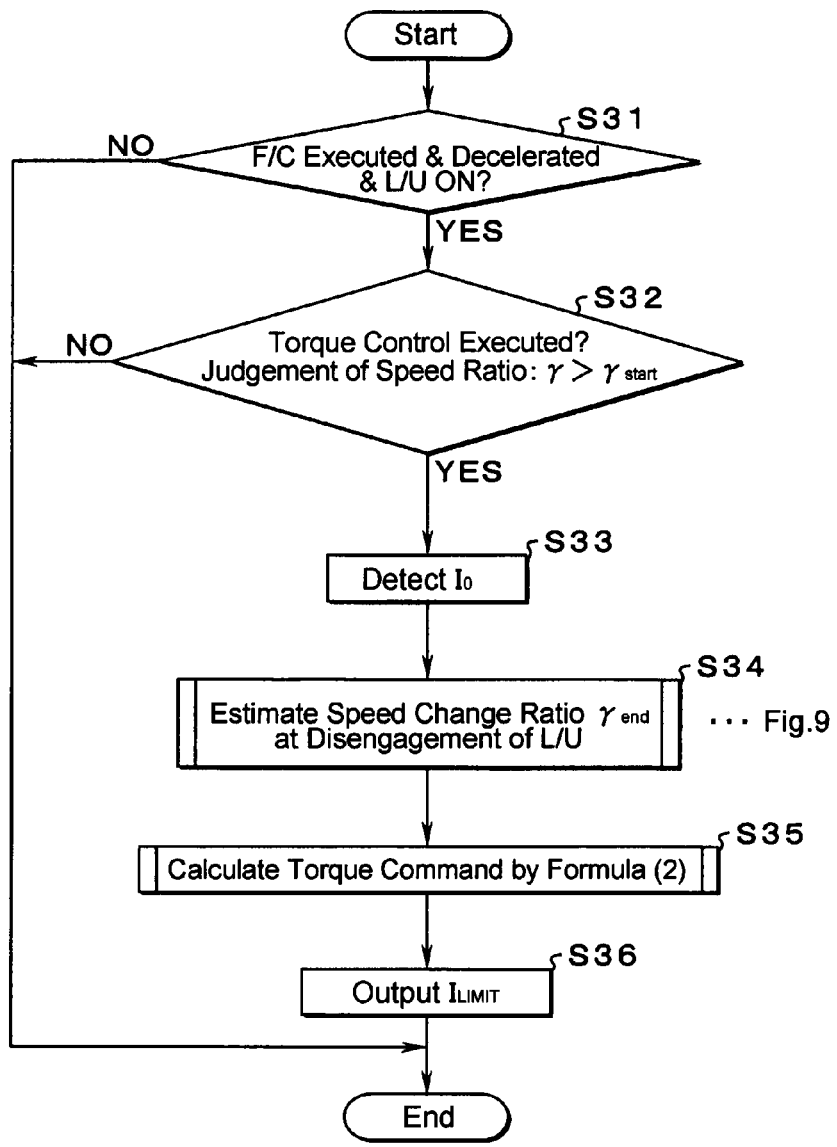
FIG. 8 is a flowchart explaining an example of controlling the load torque of the alternator by the exciting current, in case of changing the load torque of the alternator smoothly while increasing the speed change ratio.

FIG. 8 is a flowchart showing the above-explained control. First of all, it is judged whether or not the fuel-cut control is executed, the vehicle is decelerated, and the lockup clutch 35 is engaged (at step S31). As described, the lockup clutch 35 is disengaged when the vehicle speed is reduced to the lower limit of the lockup region. As a result, the inertia torque rotating the engine 1 is dampened thereby lowering the speed of the engine 1 to the reactivatable lower limit speed. In this situation, therefore, the fuel-cut control is terminated. Specifically, at step S31, it is judged whether or not a signal to terminate the fuel-cut control is outputted. In case the answer of step S31 is NO, the routine is returned without carrying out any specific control.

To the contrary, in case the fuel-cut control is carried out during deceleration of the vehicle and the lockup clutch 35 is engaged so that the answer of step S31 is YES, it is judged whether or not a torque control by increasing the speed change ratio γ of the transmission 3 is carried out (at step S32). That is, a judgment identical to aforementioned step S6 in FIG. 1 is carried out at step S32. Specifically, it is judged whether or not the current speed change ratio γ is increased to be larger than the speed change ratio $\gamma_{start}$ at the commencement of the routine shown in FIG. 8. In case the answer of step S32 is NO, the routine is returned without carrying out any specific control.

To the contrary, in case the speed change ratio γ is increased so that the answer of step S32 is YES, an initial exciting current value ($I_0$) applied to the alternator 10 is detected at a moment when the torque control by increasing the speed change ratio γ is started (at step S33). Then, the speed change ratio γ end at a moment when the lockup clutch 35 is to be disengaged is estimated (at step S34). That is, the speed change ratio $\gamma_{end}$ to be achieved at a moment when the fuel-cut control is terminated is estimated.

Figure 9:
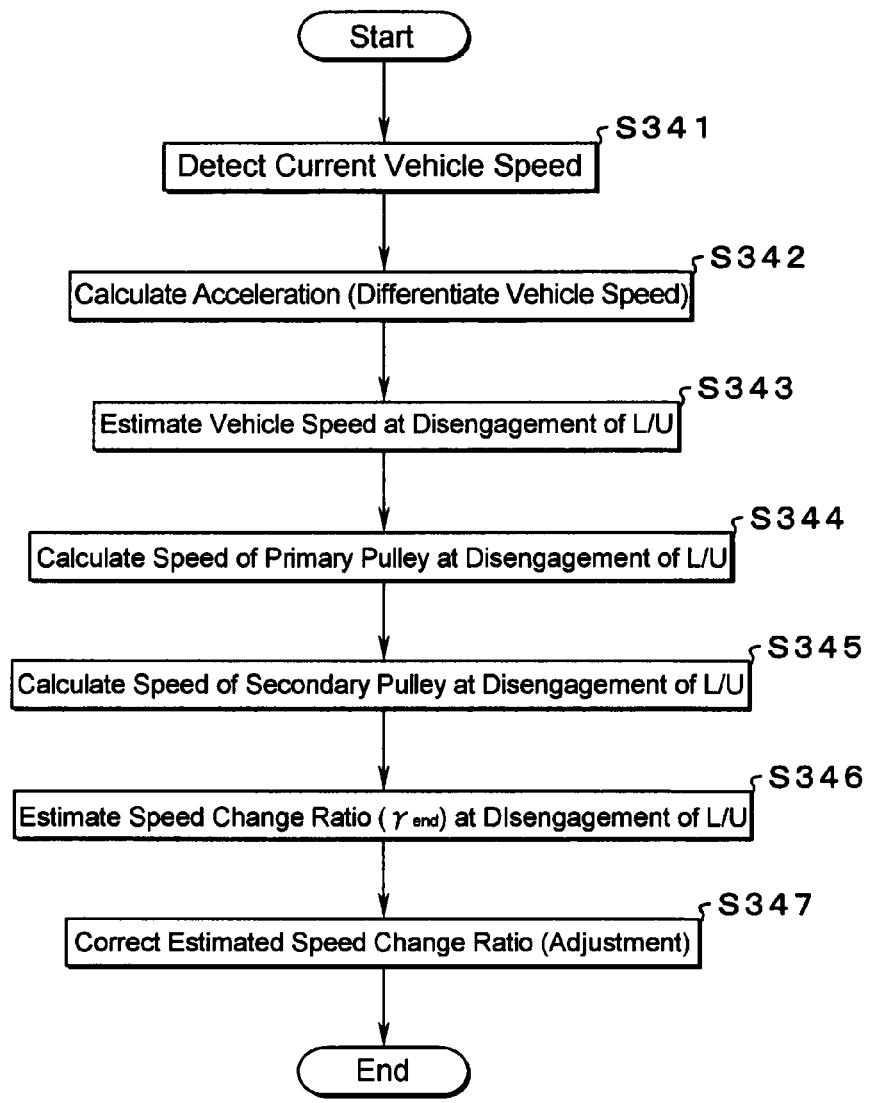
FIG. 9 is a flowchart explaining a control example of estimating the speed change ratio at the moment when the lockup clutch is disengaged.

FIG. 9 is a flowchart showing an example of a subroutine to calculate the speed change ratio $\gamma_{end}$. As shown in FIG. 9, first of all, a current vehicle speed is detected by the wheel speed sensor 15 (at step S341). Then, acceleration of the vehicle is calculated by differentiating the current vehicle speed detected at step S341 (at Step S342). Alternatively, the acceleration of the vehicle may also be obtained based on a detection signal of the acceleration sensor 16.

Then, the vehicle speed at a moment when the lockup clutch 35 is to be disengaged is estimated on the basis of the calculated acceleration of the vehicle (at step S343). As described, the fuel-cut control is terminated when the speed of the engine 1 is lowered to the reactivatable lower limit speed, and in this situation, the speed change ratio γ of the transmission 3 is increased to the maximum speed change ratio $\gamma_{MAX}$. Therefore, the vehicle speed at the moment when the lockup clutch 35 is to be disengaged can be calculated by dividing the reactivatable lower limit speed of the engine 1 at which the delivery of fuel is restarted, by the maximum speed change ratio $\gamma_{MAX}$. Accordingly, a required time from the moment at which the current vehicle speed is detected to the moment at which the lockup clutch 35 is disengaged can be estimated based on the current vehicle speed and the calculated acceleration of the vehicle. Specifically, the lockup clutch 35 is disengaged prior to restarting the delivery of fuel to the engine 1, and a timing to disengage the lockup clutch 35 prior to restarting the delivery of fuel is determined in advance taking into consideration the delay in the disengagement of the lockup clutch 35. Therefore, the vehicle speed at the moment when the lockup clutch 35 is to be disengaged can be estimated based on the timing to disengage the lockup clutch 35, the calculated acceleration of the vehicle, and the current speed of the vehicle.

Then, a speed of the primary pulley 31 at a moment when the lockup clutch 35 is to be engaged is calculated (at step S344). Specifically, the speed of the primary pulley 31 can be calculated based on the speed of the engine 1 detected by the engine speed sensor 14. Then, a speed of the secondary pulley 32 at a moment when the lockup clutch 35 is to be engaged is calculated (at step S345). As described, the secondary pulley 32 is connected with the drive wheel through the differential 6. Therefore, the speed of the secondary pulley 32 can be calculated by calculating a wheel speed based on the vehicle speed calculated at step S343, and carrying out a calculation based on the calculated wheel speed and a speed reducing ratio from the secondary pulley 32 to the drive wheel 8.

Then, the speed change ratio $\gamma_{end}$ at the moment when the lockup clutch 35 is to be disengaged is estimated based on the speeds of the primary pulley 31 and the secondary pulley 32 thus calculated (at step S346). The speed change ratio $\gamma_{end}$ thus calculated is then corrected taking into consideration the characteristics of the vehicle (at step S347). Specifically, such correction of the speed change ratio $\gamma_{end}$ may be carried out according to need, on the basis of the required characteristics of the vehicle, an intention of design, a result of simulation, a result of a driving test and so on. Instead, the speed change ratio $\gamma_{end}$ may also be adjusted using a predetermined factor. Thus, the speed change ratio $\gamma_{end}$ at a moment when disengaging the lockup clutch 35 is estimated at step S34 shown in FIG. 8.

Coming back to FIG. 8, then, a command value for adjusting the load torque of the alternator 10 which can keep the jerk during deceleration constant as much as possible is calculated (at step S35). For this purpose, specifically, an excite current command value $I_{LIMIT}$ applied to the alternator 10 is calculated using the following formula:

$$I_{Limit}=I_0\cdot(\gamma_{end}-\gamma)/(\gamma_{end}-\gamma_{start}) \quad (2).$$

As described, a LIN alternator possible to be controlled by controlling any of the exciting current (I) and the voltage applied thereto is used to serve as the alternator 10.

Then, the excite current command value $I_{Limit}$ calculated at step S35 is outputted from the ECU 13 to the alternator 10 (at step S36).

The controls shown in FIGS. 8 and 9 are executed by the ECU 13 composed mainly of a microcomputer. Therefore, step S31 may be called as a fuel-cut judging means, step S32 may be called as a speed change ratio judging means, step S33 may be called as an exciting current detecting means, step S34 may be called as a speed change ratio estimating means, step S35 may be called as a load torque control means or a command value calculating means, and step S36 may be called as a load torque control means or a control command output means.

In the control shown in FIG. 9, step S341 may be called as a vehicle speed detecting means, step S342 may be called as an acceleration calculating means, step S343 may be called as a target vehicle speed calculating means, steps S344, S345 and S346 may be called as a target speed change ratio estimating means, step S347 may be called as a target speed change ratio correcting means.

That is, a control system for carrying out the routines shown in FIGS. 8 and 9 is configured to reduce a load torque of an alternator in response to an increase in a speed change ratio during an execution of a fuel-cut control, and the control system comprises: an exciting current detecting means, which detects an exciting current value applied to an alternator when starting a control to increase the speed change ratio, in case the vehicle is decelerated by increasing the speed change ratio during an execution of the fuel-cut control; a speed change ratio estimating means, which estimates a speed change ratio at a moment when the fuel-cut control is to be terminated; and a load torque control means, which calculates a command signal for controlling the load torque of the alternator based on the speed change ratio when started to be increased, the current speed change ratio, the estimated speed change ratio, and the detected exciting current, and which outputs the calculated command signal to the alternator.

The load torque applied to the engine 1 resulting from driving the alternator 10 may also be adjusted by controlling voltage applied to the alternator 10. As described, the control example shown in FIG. 8 is configured to control the load torque of the alternator 10 using the exciting current (I) thereby preventing the vehicle from being decelerated excessively. That is, the control example shown in FIG. 8 is applied to the LIN alternator 10 possible to be controlled by controlling any of the exciting current (I) and the voltage applied thereto. However, in case a conventional voltage control type alternator is used as the alternator 10, the alternator 10 has to be controlled by controlling the voltage applied thereto. A control example to control the load torque of the alternator 10 by controlling the voltage applied thereto is shown in FIG. 10.

Figure 10:
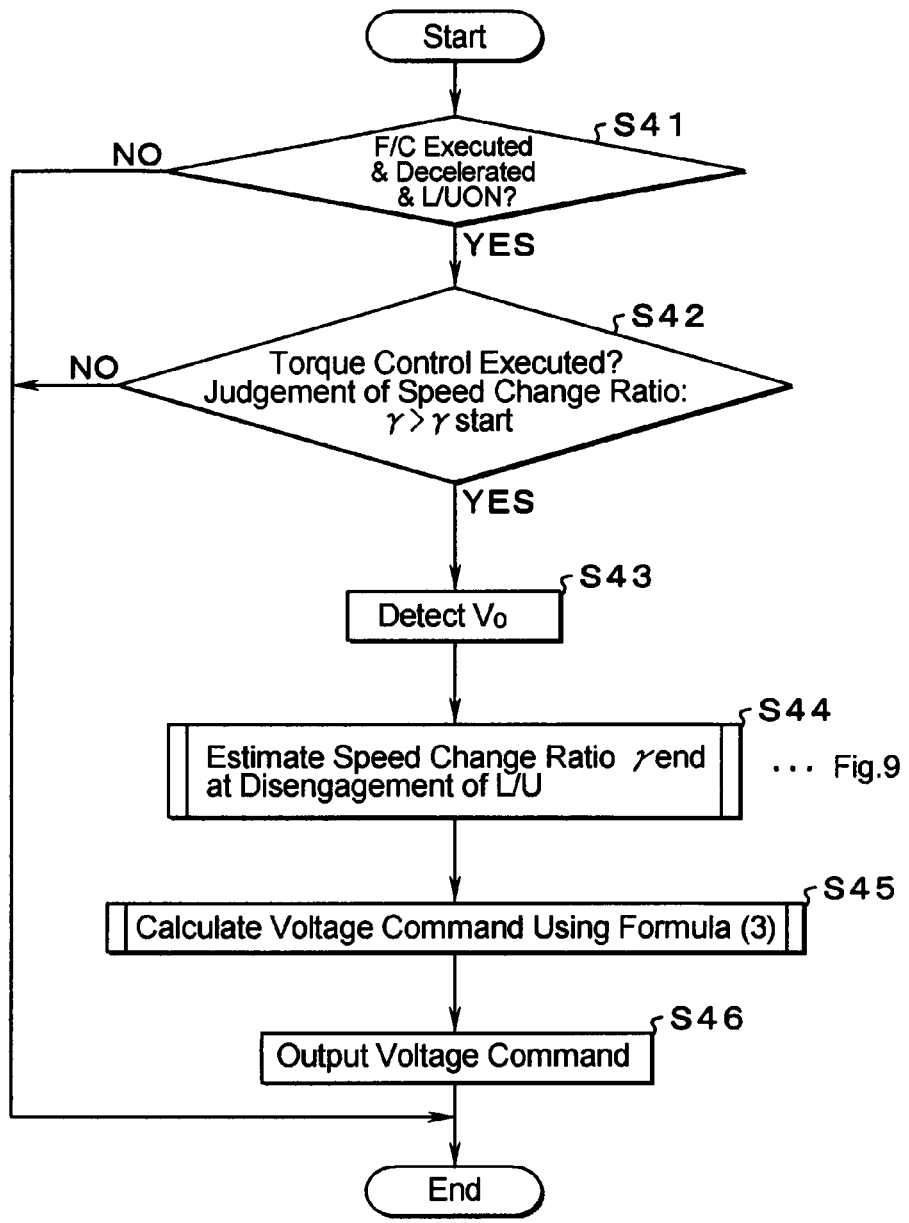
FIG. 10 is a flowchart explaining an example of controlling the load torque of the alternator by the voltage command, in case of changing the load torque of the alternator smoothly while increasing the speed change ratio.

As shown in FIG. 10, first of all, it is judged whether or not the fuel-cut control is executed, the vehicle is decelerated, and the lockup clutch 35 is engaged (at step S41). Thus, the judgment carried out at step S41 is identical to the judgment carried out at step S31 in FIG. 8. In case the answer of step S41 is NO, the routine is returned without carrying out any specific control.

To the contrary, in case the fuel-cut control is carried out during deceleration of the vehicle and the lockup clutch 35 is engaged so that the answer of step S41 is YES, it is judged whether or not a torque control by increasing the speed change ratio γ of the transmission 3 is carried out (at step S42). Thus, the control carried out at step S42 is identical to the controls carried out at steps S6 in FIG. 1 and S32 in FIG. 8. In case the answer of step S42 is NO, the routine is returned without carrying out any specific control.

To the contrary, in case the speed change ratio γ is increased so that the answer of step S42 is YES, an initial voltage command ($V_0$) inputted to the alternator 10 is detected at a moment when the torque control by increasing the speed change ratio γ is started (at step S43). Then, the speed change ratio $\gamma_{end}$ at the moment when the lockup clutch 35 is to be disengaged is estimated (at step S44). That is, the speed change ratio $\gamma_{end}$ at the moment when the fuel-cut control is terminated is estimated. Thus, the control carried out at step S44 is identical to the control carried out at step S34 in FIG. 8. Therefore, the speed change ratio $\gamma_{end}$ is calculated by the procedure shown in FIG. 9.

Then, a voltage command for adjusting the load torque of the alternator 10 which can keep the jerk during deceleration constant as much as possible is calculated (at step S45). Specifically, the voltage command value V to control the alternator 10 is calculated using the following formula:

$$V = V_0 \cdot (\gamma_{end} - \gamma) / (\gamma_{end} - \gamma_{start}) \cdot \gamma_{start} / \gamma \qquad (3).$$

Then, the voltage command value V calculated at step S45 is outputted from the ECU 13 to the alternator 10 (at step S46).

The control shown in FIG. 10 is executed by the ECU 13 composed mainly of a microcomputer. Therefore, step S41 may be called as a fuel-cut judging means, step S42 may be called as a speed change ratio judging means, step S43 may be called as a voltage detecting means, step S44 may be called as a speed change ratio estimating means, step S45 may be called as a load torque control means or a command value calculating means, and step S46 may be called as a load torque control means or a control command output means.

That is, a control system for carrying out the routine shown in FIG. 10 is configured to change a load torque of an alternator in response to an increase in a speed change ratio during an execution of a fuel-cut control, and the control system comprises: a voltage detecting means, which detects a voltage applied to an alternator when starting a control to increase the speed change ratio, in case the vehicle is decelerated by increasing the speed change ratio during an execution of the fuel-cut control; a speed change ratio estimating means, which estimates a speed change ratio at a moment when the fuel-cut control is terminated; and a load torque control means, which calculates a command signal for controlling the load torque of the alternator based on the speed change ratio when started to be increased, the current speed change ratio, the estimated speed change ratio, and the detected voltage, and which outputs the calculated command signal to the alternator.

Thus, the control example shown in FIG. 10 is configured to calculate the voltage command V using the estimated speed change ratio $\gamma_{end}$, and to output the calculated voltage command V to the alternator 10. In case of thus using the voltage command V to control the alternator 10, the voltage command V may also be calculated using a target load torque $T_D$ of the alternator 10 instead of using the estimated speed change ratio $\gamma_{end}$ of the transmission 3. A control example to control the alternator 10 by calculating the voltage command V applied thereto using the target load torque $T_D$ is shown in FIG. 11.

Figure 11:
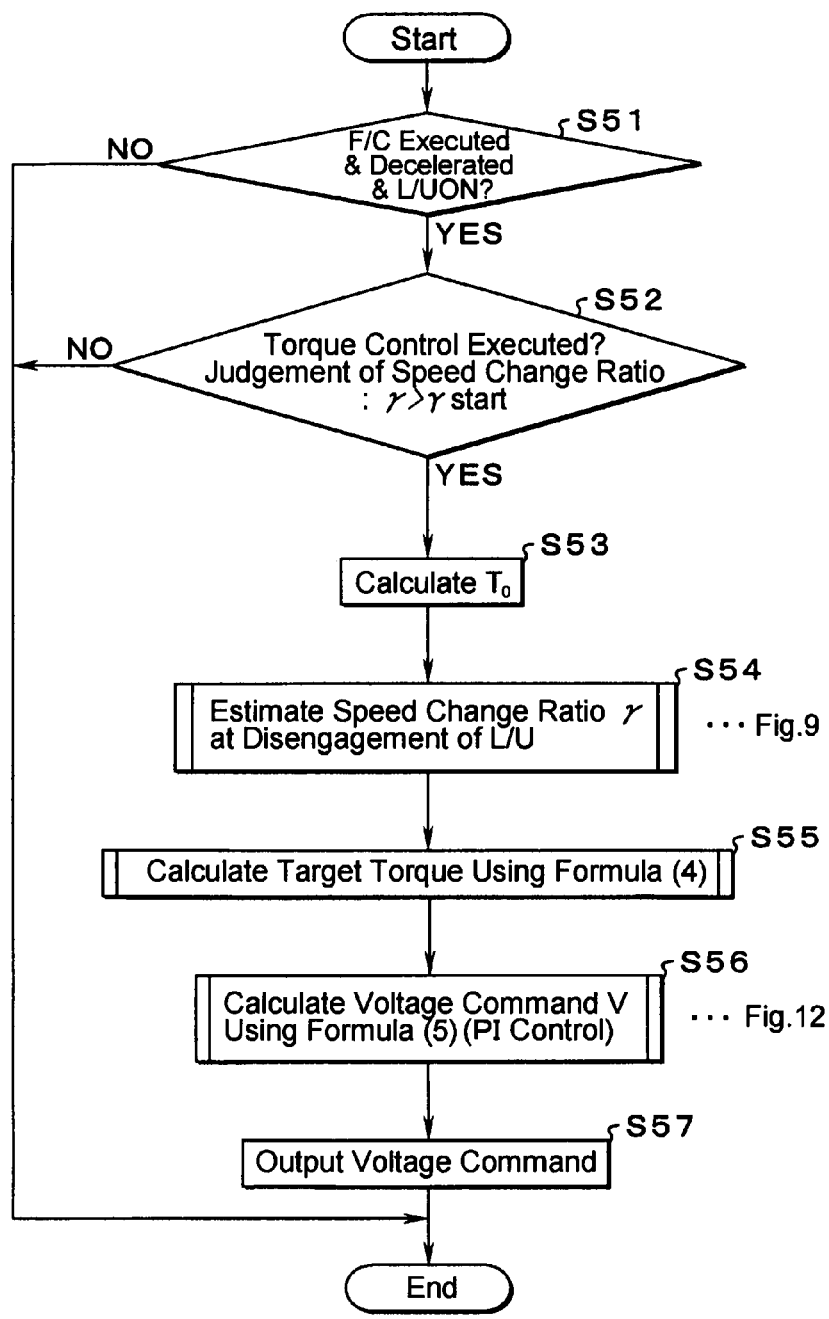
FIG. 11 is a flowchart explaining another example of controlling the load torque of the alternator by the voltage command, in case of changing the load torque of the alternator smoothly while increasing the speed change ratio.

As shown in FIG. 11, first of all, it is judged whether or not the fuel-cut control is executed, the vehicle is decelerated, and the lockup clutch 35 is engaged (at step S51). Thus, the judgment carried out at step S51 is identical to the judgments carried out at steps S31 in FIG. 8 and S41 in FIG. 10. In case the answer of step S51 is NO, the routine is returned without carrying out any specific control.

To the contrary, in case the fuel-cut control is carried out during deceleration of the vehicle and the lockup clutch 35 is engaged so that the answer of step S51 is YES, it is judged whether or not a torque control by increasing the speed change ratio γ of the transmission 3 is carried out (at step S52). Thus, the control carried out at step S52 is identical to the controls carried out at steps S6 in FIG. 1, S32 in FIG. 8 and S42 in FIG. 10. In case the answer of step S52 is NO, the routine is returned without carrying out any specific control.

To the contrary, in case the speed change ratio γ is increased so that the answer of step S52 is YES, an initial voltage command ($V_0$) inputted to the alternator 10 is detected at a moment when the control to increase the speed change ratio γ is started, and an initial load torque $T_0$ of the alternator 10 is calculated based on the detected initial voltage command (at step S53). Then, the speed change ratio $\gamma_{end}$ at the moment when the lockup clutch 35 is to be disengaged is estimated (at step S54). That is, the speed change ratio $\gamma_{end}$ at the moment when the fuel-cut control is terminated is estimated. Thus, the control carried out at step S54 is identical to the controls carried out at steps S34 in FIG. 8 and S44 in FIG. 10. Therefore, the speed change ratio $\gamma_{end}$ is calculated by the procedure shown in FIG. 9.

Thus, the initial load torque $T_0$ of the alternator 10 at a moment when the torque control by increasing the speed change ratio γ is started, and the estimated speed change ratio $\gamma_{end}$ at the moment when the fuel-cut control is terminated (at point t2) are obtained. Then, the target load torque $T_D$ of the alternator 10 is calculated (at step S55) using the following formula:

$$T_D = T_0 \cdot (\gamma_{end} - \gamma)/(\gamma_{end} - \gamma_{start}) \cdot \gamma_{start}/\gamma \quad (4).$$

Then, a voltage command V for adjusting the load torque of the alternator 10 which can keep the jerk during deceleration constant is calculated by carrying out a proportional integral control (abbreviated as PI control) based on a deviation between the target load torque $T_D$ thus calculated using the above formula (4) and an actual load torque (at step S56).

Figure 12:
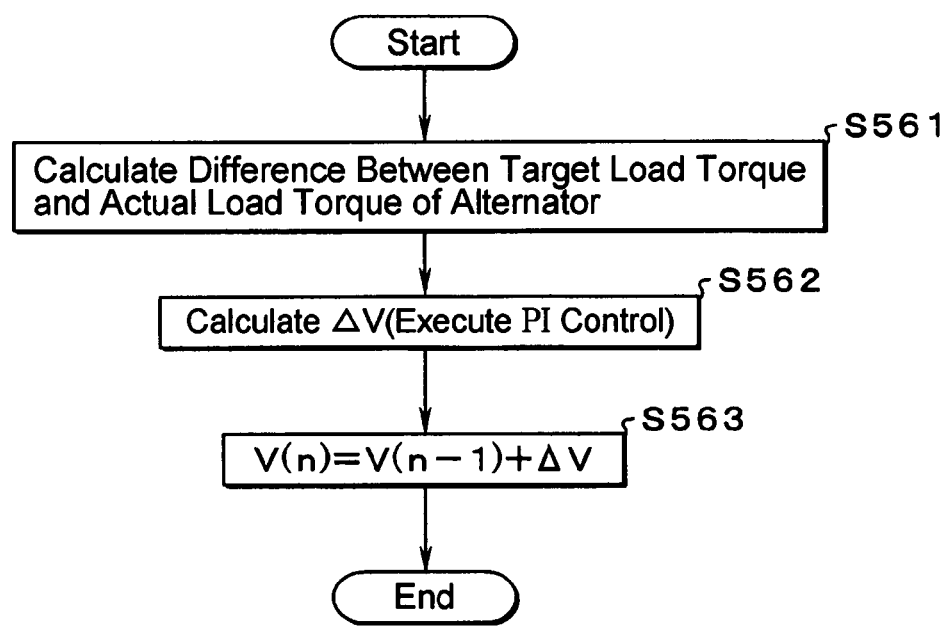
FIG. 12 is a flowchart showing a subroutine of the control shown in FIG. 11 for calculating the voltage command.

An example of a procedure for calculating the voltage command V based on a difference between the target load torque $T_D$ and the current actual load torque of the alternator 10, that is, an example of a subroutine of the control carried out at step S56 is shown in FIG. 12. As shown in FIG. 12, first of all, a difference between the target load torque $T_D$ and the actual current load torque of the alternator 10 is calculated (at step S561). Then, a voltage difference $\Delta V$ between a voltage to be generated by the alternator 10 based on the target load torque $T_D$ and a current voltage generated by the alternator 10 is calculated by carrying out the PI control based on the difference between the target load torque $T_D$ and the actual current load torque of the alternator 10 (at step S562).

Then, the voltage command value V for controlling the load torque of the alternator 10 is calculated using the voltage difference $\Delta V$ thus calculated, by the following formula:

$$Vn = Vn-1 + \Delta V = Vn-1 + K_P(T_D - T) + K_I \int (T_D - T) dt \quad (5)$$

where Vn represents the current voltage command value, Vn−1 represents a previous voltage command value of a previous routine, and $K_P$ and $K_I$ represent control gains determined based on a test or simulation.

Then, coming back to FIG. 11, the voltage command value V calculated at step S563 is outputted from the ECU 13 to the alternator 10 (at step S57).

The controls shown in FIGS. 11 and 12 are executed by the ECU 13 composed mainly of a microcomputer. Therefore, step S51 may be called as a fuel-cut judging means, step S52 may be called as a speed change ratio judging means, step S53 may be called as a load torque detecting means, step S54 may be called as a speed change ratio estimating means, step S55 may be called as a target load torque calculating means, step S56 may be called as an load torque control means or a command value calculating means, and step S57 may be called as an load torque control means or a control command output means.

In the control shown in FIG. 12, step S561 may be called as a load difference calculating means for calculating a difference between the target load torque $T_D$ and the actual current load torque of the alternator 10, step S562 may be called as a voltage difference calculating means for calculating a voltage difference between a voltage generated by the target load torque and a currently generated voltage, and step S563 may be called as a load torque control means, which calculates a voltage command value and outputs the calculated voltage command value.

That is, a control system for carrying out the routine shown in FIG. 11 is configured to change a load torque of an alternator in response to an increase in a speed change ratio during an execution of a fuel-cut control, and the control system comprises: a load torque detecting means, which detects a load torque of an alternator when starting a control to increase the speed change ratio, in case the vehicle is decelerated by increasing the speed change ratio during an execution of the fuel-cut control; a speed change ratio estimating means, which estimates a speed change ratio at a moment when the fuel-cut control is terminated; a target load torque calculating means, which calculates a load torque to be achieved when the fuel-cut control is terminated; and a load torque control means, which calculates a command signal for controlling the load torque of the alternator based on the speed change ratio when started to be increased, the current speed change ratio, the estimated speed change ratio, and the voltage command value, and which outputs the calculated command signal to the alternator.

Figure 13:
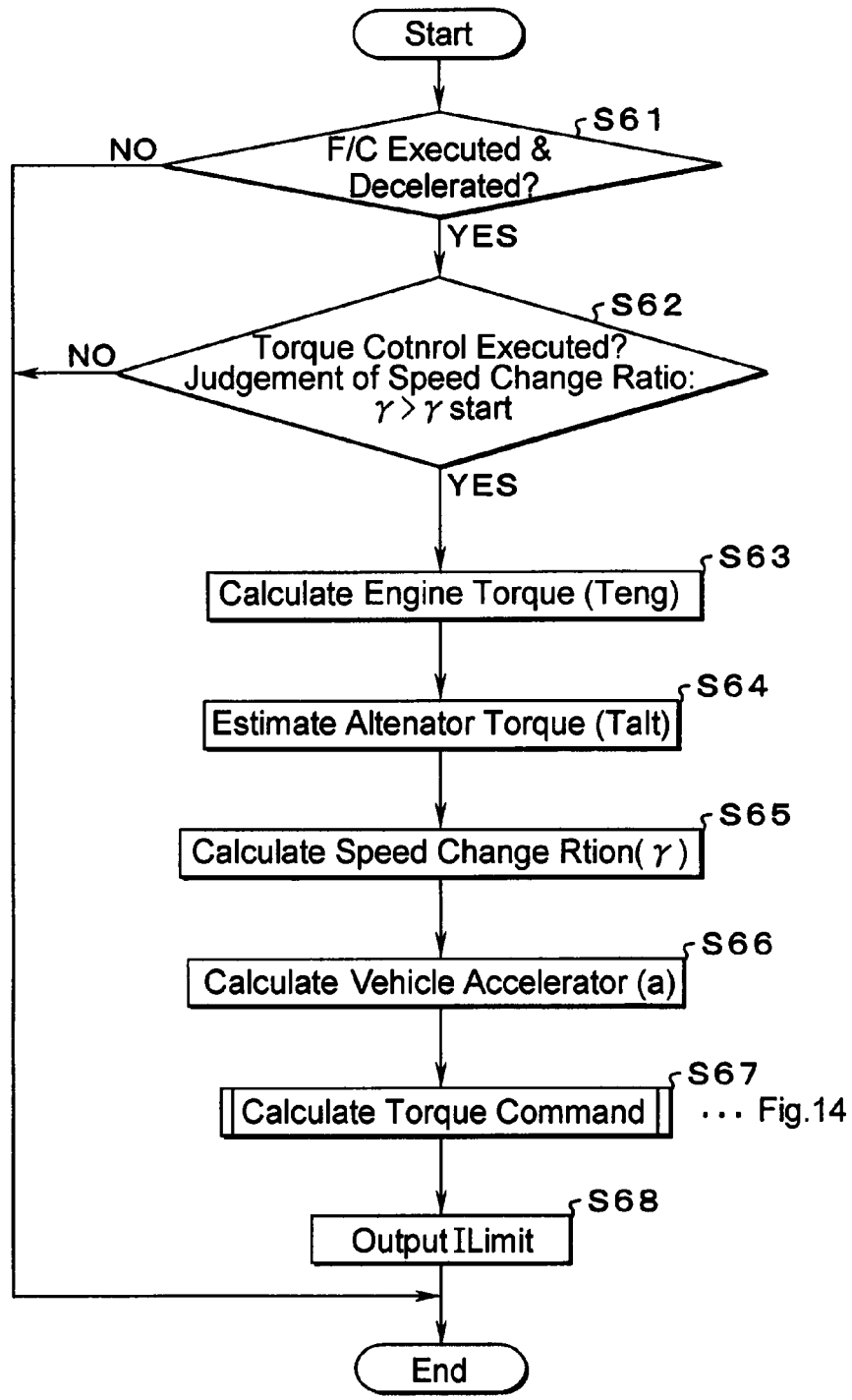
FIG. 13 is a flowchart explaining an example of controlling the load torque of the alternator based on the driving condition of the vehicle, in case of changing the load torque of the alternator smoothly while increasing the speed change ratio.

Thus, the control examples shown in FIGS. 8, 10 and 11 are configured to prevent the vehicle to be decelerated excessively in case of increasing the speed change ratio γ during an execution of the fuel-cut control, using the voltage command calculated based on the target load torque $T_D$ of the alternator 10, or the target speed change ratio $\gamma_{end}$ of the transmission 3. Alternatively, it is also possible to prevent the vehicle to be decelerated excessively in case of increasing the speed change ratio γ during an execution of the fuel-cut control, based on detected condition of the vehicle such as an engine torque, a deceleration demand, acceleration, a change rate of the acceleration (i.e., a jerk). An example of the above-explained control is shown in FIG. 13. First of all, it is judged whether or not the fuel-cut control is executed, the vehicle is decelerated, and the lockup clutch 35 is engaged (at step S61). Thus, the judgment carried out at step S61 is identical to the judgments carried out at steps S31 in FIG. 8, S41 in FIG. 10 and S51 in FIG. 11. In case the answer of step S61 is NO, the routine is returned without carrying out any specific control.

To the contrary, in case the fuel-cut control is carried out during deceleration of the vehicle and the lockup clutch 35 is engaged so that the answer of step S61 is YES, it is judged whether or not a torque control by increasing the speed change ratio γ of the transmission 3 is carried out (at step S62). Thus, the control carried out at step S62 is identical to the controls carried out at steps S6 in FIG. 1, S32 in FIG. 8, S42 in FIG. 10 and S52 in FIG. 11. In case the answer of step S62 is NO, the routine is returned without carrying out any specific control.

To the contrary, in case the speed change ratio γ is increased so that the answer of step S62 is YES, the current engine torque $T_{eng}$ is calculated (at step S63). Specifically, the engine torque $T_{eng}$ is calculated based on the detection signal from the engine speed sensor.

Then, the load torque $T_{ALT}$ of the alternator 10 is estimated with reference to the map shown in FIG. 2 (at Step S64). Then, the current speed change ratio γ of the transmission 3 is calculated based on a difference between the speeds of the input shaft and output shaft of the transmission 3 (at step S65). Then, the current acceleration (a) of the vehicle is calculated by differentiating the vehicle speed detected by the wheel speed sensor 15 (at step S66). Instead, the current acceleration (a) may also be obtained based on the detection signal from the acceleration sensor 16.

Figure 14:
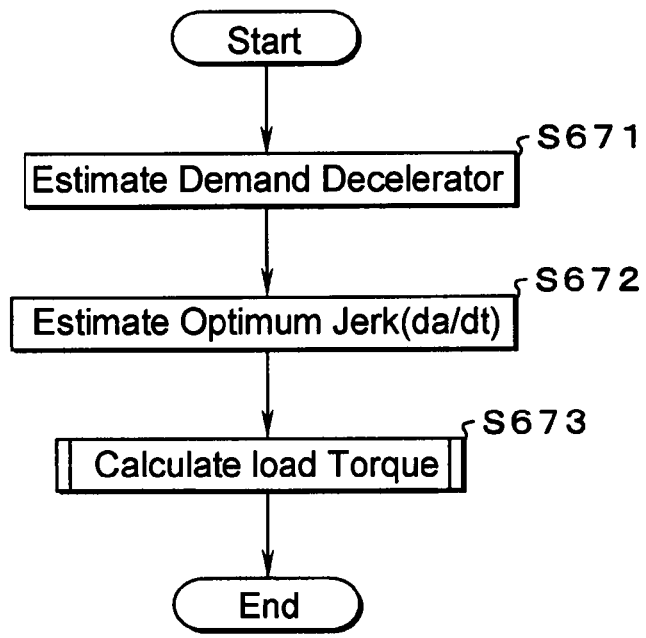
FIG. 14 is a flowchart showing a subroutine of the control shown in FIG. 13 for calculating a torque command of the engine for driving the alternator, while estimating the deceleration demand from a depression of the brake pedal.

Then, the torque command Tc applied to the engine 1 to drive the alternator 10 is calculated based on the current load torque $T_{ALT}$, the current speed change ratio γ, and the current acceleration (a) thus obtained (at step S67). Specifically, the torque command Tc is set to a value possible to optimize the jerk of the vehicle during deceleration, and in this example, the torque command Tc is determined based on an estimated deceleration demand. FIG. 14 is a flowchart showing a subroutine for calculating the torque command Tc to optimize the jerk of the vehicle. As shown in FIG. 14, first of all, a depressing amount of a brake pedal is detected (at step S671). That is, step S671 is executed to estimate a current deceleration demand, and specifically, the deceleration demand may be estimated from a depression of a brake pedal detected by the brake stroke sensor 19, or from a hydraulic pressure in the master cylinder 25 converting a depressing force of the brake pedal into hydraulic pressure.

Figure 15:
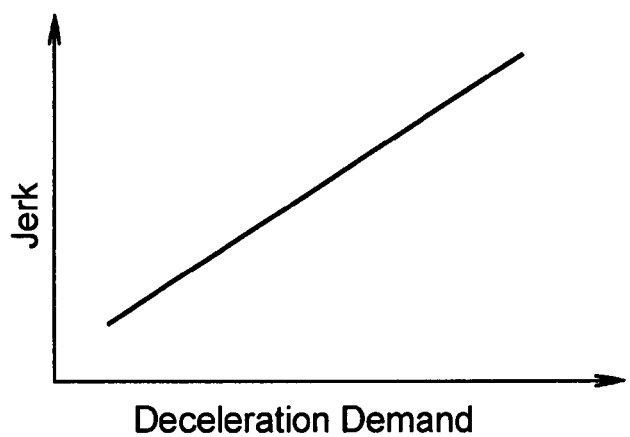
FIG. 15 is an example of a map for estimating an optimum jerk based on the deceleration demand during an execution of the control shown in FIG. 13.

Then, an optimum jerk with respect to the estimated deceleration demand is estimated (at step S672). FIG. 15 is a map used to estimate the optimum jerk, and as can be seen from FIG. 15, the jerk is optimized with respect to the deceleration demand, and the optimized jerk is increased in proportion to an increase in the deceleration demand.

Then, the load torque of the alternator 10 required to achieve the optimum jerk of the vehicle with respect to the deceleration demand is calculated (at step S673). Preferably, the jerk of the vehicle is reduced as small as possible. For this purpose, an optimum load torque $T_{ALT}$ of the alternator 10 applied to the engine 1 to achieve a constant jerk is calculated by the following procedure. Specifically, the driving force F of the vehicle can be expressed by the following formula:

$$F = \text{torque·final reduction ratio·speed change ratio·power transmission efficiency/tire loaded radius} \quad (6)$$

Here, an equation of motion is expressed as:

$$F = ma$$

where "m" represents a weight of the vehicle, and "a" represents acceleration of the vehicle. Accordingly, the following equation (7) is obtained.

$$ma = \text{torque·final reduction ratio·speed change ratio·power transmission efficiency/tire loaded radius} \quad (7)$$

Accordingly, the acceleration "a" in the above equation can be calculated using the following formula:

$$a = \text{torque·final reduction ratio·speed change ratio·power transmission efficiency/tire loaded radius}/m \quad (8)$$

Here, the longitudinal acceleration G of the vehicle can be calculated using the following formula:

$$G = a/g \quad (9);$$

where "g" represents gravitational acceleration.

Meanwhile, the jerk "da/dt" of the vehicle can be calculated using the following equation:

$$da/dt = B \cdot dT/dt \cdot \gamma + BT \cdot d\gamma/dt \quad (10)$$

where "T" represents the torque. Here, the factor "B" in the above equation (10) can be calculated using the following formula:

$$B = \text{final reduction ratio·power transmission efficiency/tire loaded radius}/m.$$

The torque "T" in the above equation (10) can be divided into the component of the engine torque $T_{eng}$ and the component of the load torque $T_{ALT}$ of the alternator as expressed by the following formula:

$$T = T_{eng} + T_{ALT} \quad (11).$$

Accordingly, the jerk "da/dt" of the vehicle can be calculated by substituting the component of the engine torque $T_{eng}$ and the component of the load torque $T_{ALT}$ of the alternator into the above equation (10) as expressed by the following equation:

$$da/dt = B \cdot \gamma \cdot d(T_{eng} + T_{ALT})/dt + B(T_{eng} + T_{ALT}) \cdot d\gamma/dt \quad (12).$$

Provided that the engine torque $T_{eng}$ is constant during deceleration of the vehicle, a differential of the engine torque $T_{eng}$ may be approximated to zero. For this reason, the above equation (12) can be simplified as the following equation:

$$da/dt = B \cdot \gamma \cdot dT_{ALT}/dt + B(T_{eng} + T_{ALT}) \cdot d\gamma/dt \quad (13).$$

The above equation (13) may be modified into the following equation:

$$dT_{ALT}/dt = \{da/dt - B(T_{eng} + T_{ALT}) \cdot d\gamma/dt\}/B\gamma \quad (14).$$

The change rate of the load torque of the alternator 10 obtained by the above equation (14) may be expressed as an amount of change in the load torque $T_{ALT}$ of the alternator 10, as expressed by the following equation:

$$T_{ALT(n+1)} = T_{ALT(n)} + d(T_{ALT(n)})/dt = (da/dt - BT_{ALT(n)} \cdot d\gamma/dt) \cdot 1/B\gamma_{(n)} \quad (15).$$

Accordingly, the optimum value of the load torque $T_{ALT}$ of the alternator for achieving constant jerk during deceleration of the vehicle can be calculated using the above equation (15).

Coming back to FIG. 13, then, the exciting current command value $I_{Limit}$ is determined based on the optimum load torque $T_{ALT}$ calculated at step S67 with reference to FIG. 2, and outputted to the alternator 10 thereby optimizing the jerk during deceleration (at step S68). Alternatively, the load torque of the alternator 10 may also be optimized by transmitting the excite current command value $I_{LIMIT}$ from the ECU 13 to the alternator 10.

The controls shown in FIGS. 13 and 14 are executed by the ECU 13 composed mainly of a microcomputer. Therefore, step S61 may be called as a fuel-cut judging means, step S62 may be called as a speed change ratio judging means, step S63 may be called as an engine torque estimating means, step S64 may be called as a load torque estimating means, step S65 may be called as a speed change ratio calculating means, step S66 may be called as an acceleration calculating means, step S67 may be called as a load torque control means or a command value calculating means, and step S68 may be called as a load torque control means or a control command output means.

In the control shown in FIG. 14, step S671 may be called as a brake depression estimating means, step S672 may be called as an optimum jerk estimating means, and step S673 may be called as a load torque control means, which calculates an exciting current value and outputs the calculated exciting current value.

That is, a control system for carrying out the routine shown in FIG. 13 is configured to change a load torque of an alternator in response to an increase in a speed change ratio during an execution of a fuel-cut control, and the control system comprises: an engine torque estimating means, which estimates an engine torque when starting a control to increase the speed change ratio, in case the vehicle is decelerated by increasing the speed change ratio during an execution of the fuel-cut control; a load torque estimating means, which estimates a load torque of the alternator when starting the control to increase the speed change ratio; an acceleration calculating means, which calculates acceleration of the vehicle when starting the control to increase the speed change ratio; a deceleration demand estimating means, which estimates a deceleration demand for the vehicle based on the depression of the brake pedal when starting the control to increase the speed change ratio; an optimum jerk estimating means, which estimates an optimum jerk with respect to the estimated deceleration demand; and an load torque control means, which calculates a command signal for controlling the load torque of the alternator based on the calculated values, and which outputs the calculated command signal to the alternator.

Figure 16:
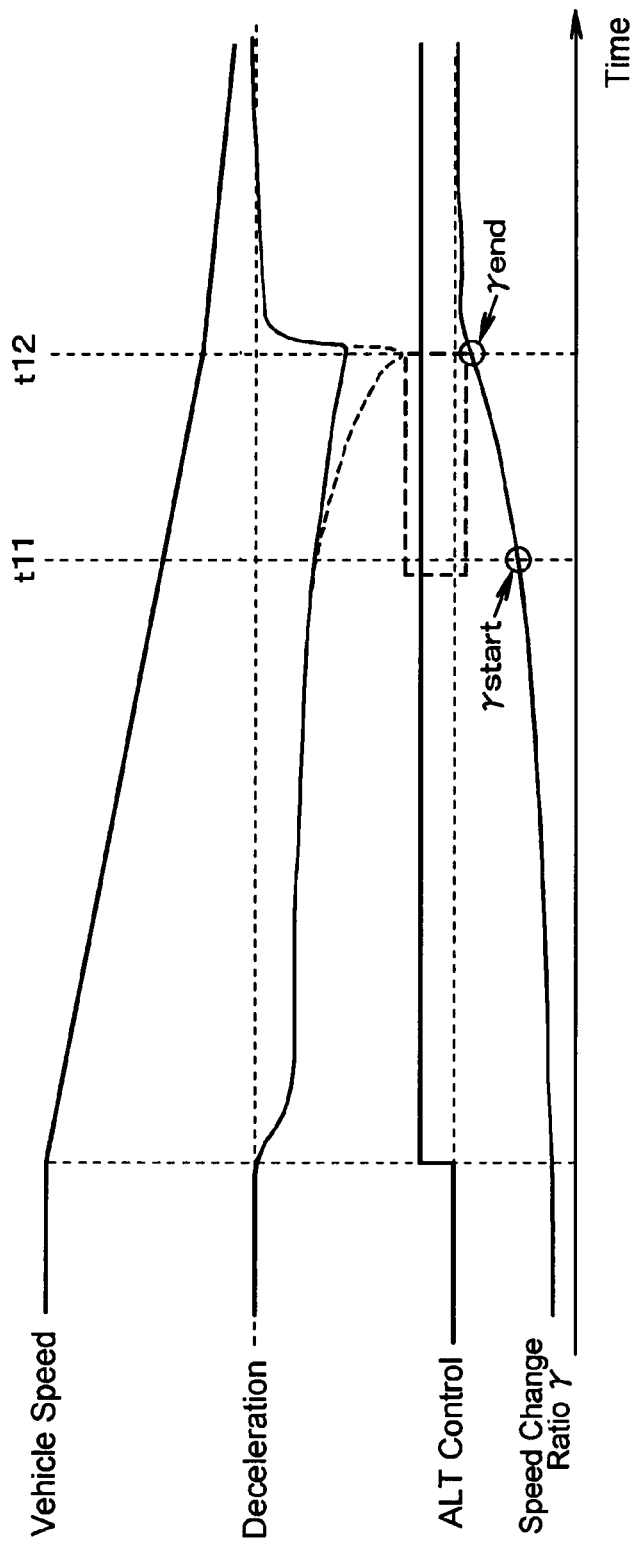
FIG. 16 is a time chart schematically indicating changes in the acceleration, speed etc. of the vehicle in case of carrying out the controls shown in FIGS. 8, 10, 11 and 13.

FIG. 16 is a time chart indicating changes in the deceleration of the vehicle, the vehicle speed and so on in case of carrying out the controls shown in FIGS. 8, 10, 11 and 13. In FIG. 16, solid lines indicate changes in those factors of the case in which the controls according to the present invention are carried out, and a broken line indicates the deceleration of the case in which the controls according to the present invention are not carried out. Before the time point t11, the vehicle is decelerated while engaging the lockup clutch 35 and carrying out the fuel-cut control. In this situation, the speed change ratio γ is increased gradually to the low speed side with a reduction in the vehicle speed. Therefore, an axial torque of the engine 1 is negative in this situation so that the deceleration of the vehicle is increased to the negative side gradually. In other words, the braking force of the vehicle is increased gradually to decelerate the vehicle with an increase in the speed change ratio γ. In this situation, the exciting current value or the voltage command value for the alternator 10 is reduced gradually in accordance with such increase in the speed change ratio γ at a predetermined time point (t11), and the load torque $T_{ALT}$ of the alternator 10 is thereby reduced gradually. In case the load torque $T_{ALT}$ of the alternator 10 as the auxiliary device is thus reduced, the load applied to the engine 1 is lightened. As a result, the axial torque of the engine 1 is increased in the reduction amount of the load torque of the alternator 10. For this reason, the vehicle will not be decelerated excessively just before the termination of the fuel-cut control.

When the vehicle speed thus decelerated is reduced to the lower limit of a lockup region, the lockup clutch 35 is disengaged. After the lockup clutch 35 is thus disengaged, the inertia torque of the running vehicle rotating the engine 1 compulsory is dampened, and the speed of the engine 1 is thereby reduced to the reactivatable lower limit speed. Therefore, the fuel-cut control is terminated at this point, that is, the delivery of fuel to the engine 1 is restarted (at point t12). When the delivery of fuel to the engine 1 is thus restarted, the engine 1 starts outputting a base torque. As a result, the acceleration of the vehicle is increased by the base torque of the engine 1 (i.e., the braking force is reduced).

Thus, as indicated by the solid line in FIG. 16, the vehicle is prevented from being decelerated excessively by the braking force generated by increasing the speed change ratio γ before the termination of the fuel-cut control. Therefore, according to the present invention, the fuel-cut control can be terminated smoothly by thus reducing the jerk before the point t12 so that the uncomfortable feeling resulting from the termination of the fuel-cut control can be reduced. On the other hand, according to the comparative example indicated by the broken line, the load torque of the alternator applied to the engine is not lightened before the termination of the fuel-cut control. Therefore, according to the comparative example, the vehicle is decelerated excessively by the increased speed change ratio γ before the termination of the fuel-cut control, and the driver may feel uncomfortable feeling when the fuel-cut control is terminated.

As explained, according to the control system of the present invention, the load to drive the alternator 10 applied to the engine 1, in other words, the negative torque of the alternator 10 applied to the engine 1 can be controlled based on the depression of the brake pedal. Therefore, in addition to the above explained advantage, the deceleration of the vehicle can be adjusted in accordance with the deceleration demand. Moreover, since the vehicle is not decelerated excessively before the termination of the fuel-cut control (i.e., before t12), an execution time of the fuel-cut control can be extended as long as possible. Therefore, the fuel economy of the vehicle can be improved by cutting the wasteful delivery of fuel to the engine 1.

The controls shown in FIGS. 1, 6, 8, 10, 11 and 13 may be combined arbitrarily according to need. For example, the controls shown in FIGS. 1, 6 and 8 may be carried out in combination. Alternatively, in the above combination, the control shown in FIG. 10, 11 or 13 may be carried out instead of the control shown in FIG. 8.

Figure 17:
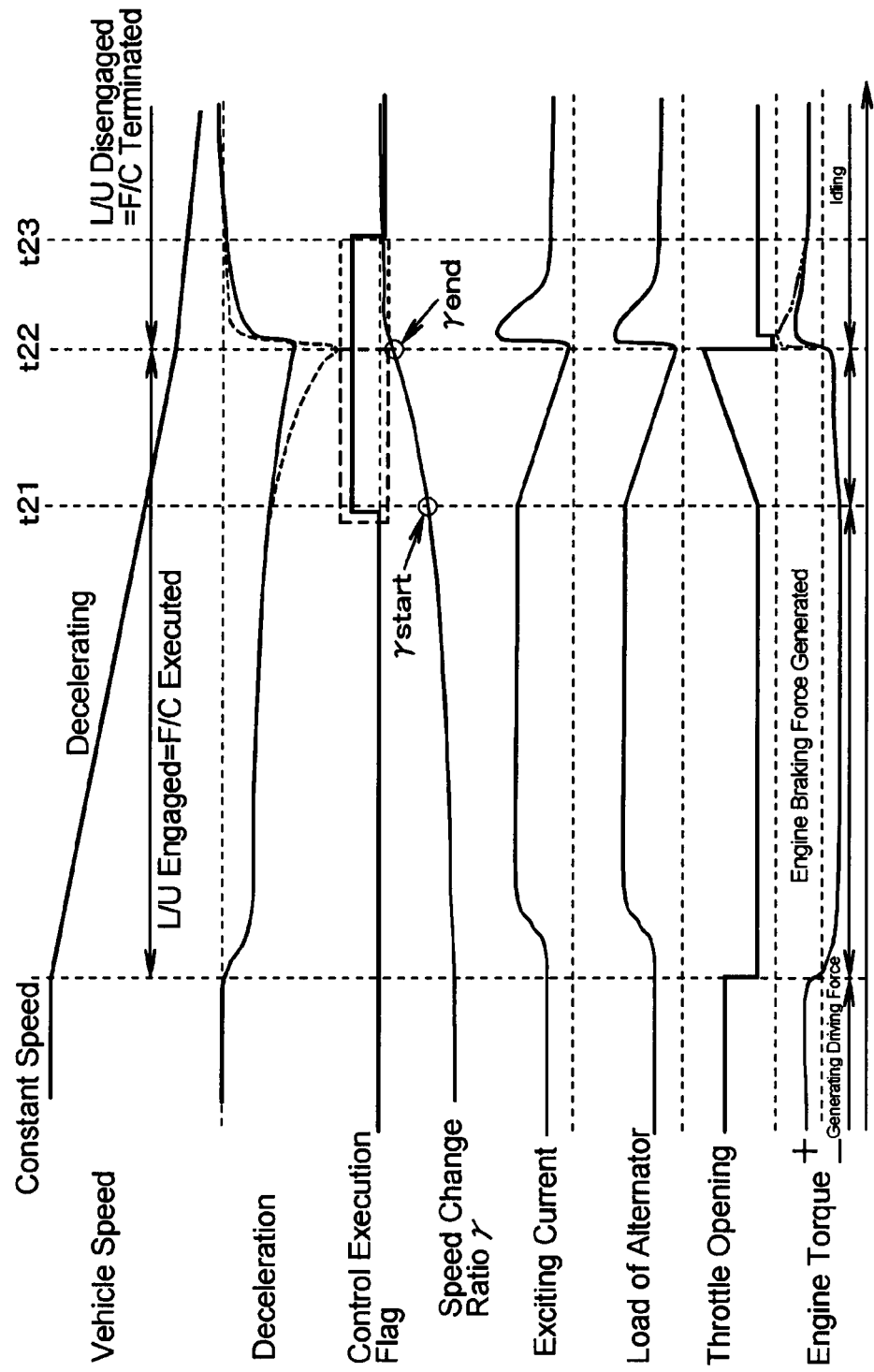
FIG. 17 is a time chart schematically indicating changes in the acceleration, speed etc. of the vehicle in case of carrying out the controls shown in FIGS. 1, 6, 8, 10, 11 and 13 in combination.

FIG. 17 is a time chart indicating changes in the acceleration of the vehicle, the vehicle speed and so on in case of carrying out the control shown in FIGS. 1 and 6, in combination with the control shown in FIG. 8, 10, 11 or 13. In FIG. 17, solid lines indicate changes in those factors of the case in which the controls according to the present invention are carried out, and broken lines indicate those factors of the case in which the controls according to the present invention are not carried out. Before the time point t21, the vehicle is decelerated while engaging the lockup clutch 35 and carrying out the fuel-cut control. In this situation, the speed change ratio γ is increased gradually to the low speed side with a reduction in the vehicle speed. Therefore, an axial torque of the engine 1 is negative in this situation so that the deceleration of the vehicle is increased to the negative side gradually. In other words, the braking force of the vehicle is increased gradually to decelerate the vehicle with an increase in the speed change ratio γ.

Then, the exciting current value or the voltage command value applied to the alternator 10 is detected (at point t21), and the load torque $T_{ALT}$ of the alternator 10 to be applied to the engine 1 at the point t22 is estimated. In addition, the speed change ratio $γ_{end}$ is estimated or the target load torque $T_D$ at the point t22 is determined.

Between the point t21 and the point t22, the air intake of the engine 1 is increased to reduce the pumping loss by increasing the opening degree θ of the throttle valve 21. As will be explained later, a surplus torque Tr of the engine 1 is to be generated when delivering fuel to the engine 1 after the termination of the fuel-cut control. Therefore, in this situation, the opening degree θ of the throttle valve 21 is increased to the maximum possible degree to suppress the surplus torque Tr of the engine 1 within a range possible to be offset by the load torque $T_{ALT}$ of the alternator 10 after the termination of the fuel-cut control. Simultaneously, the load torque $T_{ALT}$ of the alternator 10 applied to the engine 1 is reduced to prevent the vehicle from being decelerated excessively. Thus, the pumping loss of the engine 1 is reduced by increasing the air intake of the engine 1.

Specifically, in order to achieve the constant jerk during the deceleration between the point t21 and t22 resulting from increasing the speed change ratio to the $γ_{end}$, the exciting current value or the voltage command value applied to the alternator 10 is reduced gradually. As can be seen from FIGS. 2 and 17, the load torque $T_{ALT}$ of the alternator 10 is increased in proportion to an increase in the exciting current value (I). Therefore, the load of the alternator 10 applied to the engine 1 is lightened gradually from the point t21 to the point t22 by thus reducing the exciting current value (I).

As a result, an axial torque of the engine 1 is increased in the reduction amounts of the pumping loss and the load torque $T_{ALT}$ (i.e., negative torque) of the alternator 10. Therefore, the vehicle is not decelerated excessively before the termination of the fuel-cut control.

When the vehicle speed thus decelerated is reduced to the lower limit of a lockup region, the lockup clutch 35 is disengaged. At the same time, the opening degree θ of the throttle valve 21 is reduced to an idling degree (i.e., an opening degree to execute an Idle Speed Control (ISC)) thereby idling the engine 1. As a result, the internal pressure of the intake pipe 20 and the axial torque of the engine 1 are reduced gradually.

In this situation, however, the air intake and the pressure in the intake pipe 20 are not reduced abruptly. Therefore, the vehicle will not be decelerated immediately.

After the lockup clutch 35 is thus disengaged, the inertia torque of the running vehicle rotating the engine 1 compulsory is reduced, and the speed of the engine 1 is thereby reduced to the reactivatable lower limit speed. Therefore, the fuel-cut control is terminated at this point, that is, the delivery of fuel to the engine 1 is restarted (at point t22). When the delivery of fuel to the engine 1 is thus restarted, the engine 1 starts outputting a base torque. As a result, the acceleration of the vehicle is increased according to the base torque (i.e., the braking force is reduced).

As described, the engine 1 is a gasoline engine subjected to the air-fuel control, therefore, the axial torque of the engine 1 is increased by increasing the air intake thereof. Meanwhile, between the time points t21 and t22, that is, before the termination of the fuel-cut control, the air intake of the engine 1 is increased by increasing the opening degree θ of the throttle valve 21 to be larger than the intake to idle the engine 1 thereby reducing the pumping loss. Therefore, when the fuel-cut control is terminated at the point t22 so that the delivery of fuel to the engine 1 is restarted, an increased amount of the fuel is delivered to the engine 1. Consequently, the axial torque of the engine 1 is increased to be larger than that of the case in which the engine 1 is idling, and the surplus torque Tr which changes acceleration of the vehicle significantly would be generated as indicated by the broken line at point t22, in addition to the base torque.

However, even after the point t22, the vehicle is still decelerating and the engine 1 is rotated compulsory by the inertia force of the vehicle. Therefore, in this situation, the vehicle is decelerated by the engine braking force and the engine torque is negative. Just after the delivery of fuel to the engine 1 is restarted at the point t22, the exciting current value (I) applied to the alternator 10 is increased temporarily thereby increasing the load torque $T_{ALT}$ of the alternator 10 applied to the engine 1 temporarily. As a result, the surplus torque Tr of the engine 1 generated as a result of restarting the delivery of fuel at the point t22 is offset by the increased load torque of the alternator 10 applied thereto. Then, when the deceleration of the vehicle becomes zero, or when the speed of the engine 1 is reduced to the idling speed, the control according to the present invention is terminated (at point t23).

Thus, the surplus torque Tr of the engine 1 exceeding the drive demand can be suppressed after the termination of the fuel-cut control by increasing the load torque of the alternator 10 applied to the engine 1. As a result, the vehicle will not be accelerated abruptly even after the termination of the fuel-cut control.

According to the examples of the present invention indicated by the solid lines in FIG. 17, therefore, the vehicle will not be decelerated excessively just before the point t22, and the acceleration of the vehicle will not be increased excessively just after the point t22. That is, the fuel-cut control can be terminated smoothly without fluctuating the longitudinal acceleration of the vehicle significantly. Meanwhile, according to the comparative example indicated by the broken lines, the air intake of the engine is not increased before the termination of the fuel-cut control and the load torque of the alternator is not increased after the termination of the fuel-cut control. Therefore, the deceleration of the vehicle may be increased excessively before the termination of the fuel-cut control. In addition, the axial torque of the engine may be increased excessively after the termination of the fuel-cut control. Therefore, the shocks resulting from such fluctuation of the longitudinal acceleration of the vehicle may deteriorate the driving comfort and drivability.

In addition to the above-explained advantages, according to the control system of the present invention, the opening degree θ of the throttle valve 21 for adjusting the air intake can be controlled based on the load of the alternator 10 during the execution of the fuel-cut control. Therefore, the opening degree θ of the throttle valve 21 can be optimized during deceleration of the vehicle. Further, since the opening degree θ of the throttle valve 21 can be optimized, the fuel will not be delivered to the engine 1 excessively. Therefore, the surplus torque Tr will not be generated by the engine 1 after the termination of the fuel-cut control so that the fuel economy of the vehicle can be improved.

Here will be briefly explained a relation between the example of the present invention thus has been explained and the claimed invention. Steps S8, S35, S36, S4, S46, S56, S57, S67 and S68 correspond to the load reducing means of the claimed invention, steps S26 and S28 correspond to the load lightening means of the claimed invention, steps S2 to S4 and S7 correspond to the throttle opening increasing means of the claimed invention, steps S28 and S29 correspond to the torque command means of the claimed invention, steps S34, S346, S347, S44 and S54 correspond to the speed change ratio estimating means of the claimed invention, steps S35, S36, S4, S46, S56 and S57 correspond to the load adjusting means of the claimed invention, step S55 corresponds to the load torque calculating means of the claimed invention, steps S56 and S57 correspond to the load torque control means, and step S343 corresponds to the disengagement estimating means of the claimed invention.

The present invention should not be limited to the examples thus far explained. For example, a compressor of an air conditioner may be used as the auxiliary device instead of the alternator. In this case, the load applied to the engine may be controlled by controlling an output of the compressor electrically.

The invention claimed is:

1. A vehicle control system,
   which is applied to a vehicle comprising
   a fluid transmission mechanism, which is provided with a lockup clutch configured to directly connect an input member and an output member transmitting torque therebetween through a fluid, and which is connected with an output side of an internal combustion engine, and
   an auxiliary device, which is connected with the internal combustion engine to be driven by a torque of the internal combustion engine, and
   which is configured to stop a delivery of fuel to the internal combustion engine while increasing a speed change ratio of a transmission thereby increasing a speed of the internal combustion engine in case the vehicle is decelerated while engaging the lockup clutch, and to disengage the lockup clutch prior to restarting the delivery of fuel to the internal combustion engine,
   wherein the deceleration of the vehicle resulting from increasing the speed change ratio while engaging the lockup clutch is suppressed by lightening a load of the auxiliary device applied to the internal combustion engine; and
   the torque increased by restarting the delivery of fuel to the internal combustion engine is suppressed by increasing the load of the auxiliary device applied to the internal combustion.

2. The vehicle control system as claimed in claim 1, comprising:

a load lightening means, which lightens a load of the auxiliary device applied to the internal combustion engine thereby suppressing an increase in the deceleration of the vehicle resulting from increasing the speed change ratio while engaging the lockup clutch; and a load increasing means, which increases the load of the auxiliary device applied to the internal combustion engine thereby suppressing an increase in the torque increased by restarting the delivery of fuel to the internal combustion engine.

3. The vehicle control system as claimed in claim 2, wherein the internal combustion engine comprises a throttle valve configured to control air intake of the internal combustion engine; and further comprising a throttle opening increasing means, which increases an opening degree of the throttle valve, in case the delivery of fuel to the internal combustion engine is stopped while increasing the speed change ratio.

4. The vehicle control system as claimed in claim 3, wherein the throttle opening increasing means is configured to increase the opening degree of the throttle valve to the maximum possible degree in case the load of the auxiliary device applied to the internal combustion engine is large.

5. The vehicle control system, as claimed in claim 3, further comprising:

a torque command means, which is adapted to add a torque command to drive the auxiliary device to an output torque command of the internal combustion engine just after a disengagement of the lockup clutch; and a means which subtracts the torque command to drive the auxiliary device from the output torque command of the internal combustion engine in case the speed of the internal combustion engine cannot be reduced even if the load of the auxiliary device is applied to the internal combustion engine just after the disengagement of the lockup clutch, and which sets the output torque command of the internal combustion engine to a value which can prevent the engine speed from being lowered, in case the speed of the internal combustion engine can be reduced by the load torque of the auxiliary device applied to the internal combustion engine just after the disengagement of the lockup clutch.

6. The vehicle control system as claimed in claim 2, wherein the auxiliary device includes an alternator, which is connected with the internal combustion engine to be driven to generate an electric power.

7. The vehicle control system as claimed in claim 1, wherein:

the internal combustion engine comprises a throttle valve configured to control air intake of the internal combustion engine; and an opening degree of the throttle valve is increased in case the delivery of fuel to the internal combustion engine is stopped while increasing the speed change ratio.

8. The vehicle control system as claimed in claim 7, wherein the opening degree of the throttle valve is increased to the maximum possible degree in case the load of the auxiliary device applied to the internal combustion engine is large.

9. The vehicle control system as claimed in claim 7, wherein:

a torque command to drive the auxiliary device is added to an output torque command of the internal combustion engine just after a disengagement of the lockup clutch;

the output torque command and the torque command to drive the auxiliary device is subtracted from the output torque command of the internal combustion engine, in case the speed of the internal combustion engine cannot be not reduced even if the load of the auxiliary device is applied to the internal combustion engine just after the disengagement of the lockup clutch; and the output torque command of the internal combustion engine is set to a value which can prevent the engine speed from being lowered in case the speed of the internal combustion engine can be reduced by the load torque of the auxiliary device applied to the internal combustion engine just after the disengagement of the lockup clutch.

10. The vehicle control system as claimed in claim 1, wherein the auxiliary device includes an alternator, which is connected with the internal combustion engine to be driven to generate an electric power.

11. A vehicle control system, which is applied to a vehicle comprising a fluid transmission mechanism, which is provided with a lockup clutch configured to directly connect an input member and an output member transmitting torque therebetween through a fluid, and which is connected with an output side of an internal combustion engine, and an auxiliary device, which is connected with the internal combustion engine to be driven by a torque of the internal combustion engine, and which is configured to stop a delivery of fuel to the internal combustion engine while increasing a speed change ratio of a transmission thereby increasing a speed of the internal combustion engine in case the vehicle is decelerated while engaging the lockup clutch, and to disengage the lockup clutch prior to restarting the delivery of fuel to the internal combustion engine, wherein the speed change ratio at a moment when the lockup clutch is to be disengaged is estimated; and the load of the auxiliary device to reduce deceleration of the vehicle resulting from increasing the speed change ratio is adjusted based on the speed change ratio at a moment when started to be increased, the estimated speed change ratio, and the current speed change ratio.

12. The vehicle control system as claimed in claim 11, comprising:

a speed change ratio estimating means, which estimates a speed change ratio at a moment when the lockup clutch is to be disengaged; and a load adjusting means, which adjusts the load of the auxiliary device to reduce deceleration of the vehicle resulting from increasing the speed change ratio, based on the speed change ratio at a moment when started to be increased, the estimated speed change ratio, and the current speed change ratio.

13. The vehicle control system as claimed in claim 12, further comprising:

a disengagement estimating means, which estimates a time point to disengage the lockup clutch based on the acceleration of the vehicle.

14. The vehicle control system as claimed in claim 11, wherein:

a time point to disengage the lockup clutch is estimated based on the acceleration of the vehicle.

15. The vehicle control system as claimed in claim 11, wherein the auxiliary device includes an alternator, which is connected with the internal combustion engine to be driven to generate an electric power.

16. The vehicle control system,
which is applied to a vehicle comprising
a fluid transmission mechanism, which is provided with a lockup clutch configured to directly connect an input member and an output member transmitting torque therebetween through a fluid, and which is connected with an output side of an internal combustion engine, and
an auxiliary device, which is connected with the internal combustion engine to be driven by a torque of the internal combustion engine, and
which is configured to stop a delivery of fuel to the internal combustion engine while increasing a speed change ratio of a transmission thereby increasing a speed of the internal combustion engine in case the vehicle is decelerated while engaging the lockup clutch, and to disengage the lockup clutch prior to restarting the delivery of fuel to the internal combustion engine,
wherein a load torque of the auxiliary device applied to the internal combustion engine is calculated using an equation of motion, wherein acceleration of a case in which the load of the auxiliary device is applied to the internal combustion engine, a speed change ratio, and a vehicle weight are used as parameters; and
the load torque of the auxiliary device is adjusted to a value possible to keep the deceleration of the vehicle within a predetermined range.

17. The vehicle control system as claimed in claim 16, comprising:
a load torque calculating means, which calculates a load of the auxiliary device applied to the internal combustion engine using an equation of motion, wherein acceleration of a case in which the load of the auxiliary device is applied to the internal combustion engine, a speed change ratio, and a vehicle weight are used as parameters; and
a load torque control means, which adjust the load torque of the auxiliary device to a value possible to keep the deceleration of the vehicle within a predetermined range.

18. The vehicle control system as claimed in claim 16, wherein the auxiliary device includes an alternator, which is connected with the internal combustion engine to be driven to generate an electric power.

* * * * *